(12) United States Patent
Yazaki et al.

(10) Patent No.: US 7,376,085 B2
(45) Date of Patent: ***May 20, 2008

(54) PACKET TRANSFERRING METHOD AND APPARATUS THAT EMPLOYS THE SAME

(75) Inventors: Takeki Yazaki, Kawasaki (JP); Yasusi Kanada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1117 days.

This patent is subject to a terminal disclaimer.

(21) Appl. No.: 10/211,562

(22) Filed: Aug. 5, 2002

(65) Prior Publication Data

US 2003/0043802 A1    Mar. 6, 2003

(30) Foreign Application Priority Data

Aug. 31, 2001    (JP) ............................. 2001-262658

(51) Int. Cl.
  *H04L 12/26* (2006.01)
  *H04L 12/28* (2006.01)
  *G06F 15/173* (2006.01)

(52) U.S. Cl. ...................... 370/235; 370/252; 370/389; 370/392; 709/238

(58) Field of Classification Search ...................... None
See application file for complete search history.

(56) References Cited

U.S. PATENT DOCUMENTS

| | | | |
|---|---|---|---|
| 6,275,861 B1 * | 8/2001 | Chaudri et al. | 709/238 |
| 6,570,875 B1 * | 5/2003 | Hegde | 370/389 |
| 6,574,195 B2 * | 6/2003 | Roberts | 370/235 |
| 6,594,268 B1 * | 7/2003 | Aukia et al. | 370/235 |
| 6,738,352 B1 * | 5/2004 | Yamada et al. | 370/238 |
| 6,757,249 B1 * | 6/2004 | Kejriwal et al. | 370/235.1 |
| 6,847,613 B2 * | 1/2005 | Mimura et al. | 370/235 |
| 6,876,668 B1 * | 4/2005 | Chawla et al. | 370/230 |
| 6,901,052 B2 * | 5/2005 | Buskirk et al. | 370/235 |

(Continued)

FOREIGN PATENT DOCUMENTS

| | | |
|---|---|---|
| JP | 2000-244570 | 2/1999 |
| JP | 2000-244574 | 2/1999 |
| JP | 2000-312225 | 9/1999 |

OTHER PUBLICATIONS

U.S. Appl. No. 09/842,130.

(Continued)

*Primary Examiner*—Steven Nguyen
(74) *Attorney, Agent, or Firm*—Reed Smith LLP; Stanley P. Fisher, Esq.; Juan Carlos A. Marquez, Esq.

(57) ABSTRACT

Every router in a network is provided with flow detecting means that detects a flow from a packet header of a packet so as to perform such packet processings as bandwidth monitoring, priority-based transferring, statistical information collecting with respect to each packet flow. Receiving a packet from a site, an edge router detects the packet flow and writes a flow identifier in the packet. Each flow identifier is uniquely decided in the network. The Internet router performs such packet processings as bandwidth monitoring, priority-based transferring, statistical information collecting with respect to each flow according to the flow identifier. The present invention can thus prevent the network from degradation of transferring performance caused by the flow detecting means of a backbone router.

7 Claims, 28 Drawing Sheets

U.S. PATENT DOCUMENTS

| | | |
|---|---|---|
| 7,020,085 B2 * | 3/2006 | Mimura et al. ............. 370/235 |
| 7,035,212 B1 * | 4/2006 | Mittal et al. ................ 370/230 |
| 7,042,848 B2 * | 5/2006 | Santiago et al. ............ 370/232 |
| 2002/0057654 A1 * | 5/2002 | Hjalmtysson ............... 370/252 |
| 2002/0181400 A1 * | 12/2002 | Zheng et al. ............... 370/235 |

OTHER PUBLICATIONS

Pending U.S. Appl. No. 09/842,130 filed Apr. 26, 2001 (Kanada et al.) and as yet unpublished. This application is only being submitted for purposes of information disclosure but should otherwise be held in confidence. (The entire application will be submitted when Applicant receives it).

S. Blake, D. Black, M. Carlson, E. Davies, Z. Wang and W. Weiss, "An Architecture for Differentiated Services", Network Working Group Memo (1998), pp. 1-36.

Masanori Uga and Kohei Shiomoto, "A Flow Identification Method Using Content Addressable Memory", The Institute of Electronics, Information and Communication Engineers, Mar. 28-31, 2000, Proceedings of the General Conference, pp. Cover sheet and p. 654.

* cited by examiner

FIG. 31

| CAM ADDRESS | | | | | | | |
|---|---|---|---|---|---|---|---|
| 1 | SIP MASK | DIP MASK | SPORT 8 | DPORT MASK | FLOW ID MASK | INPUT LINE NO. 3 | 810-1 |
| 2 | SIP MASK | DIP MASK | SPORT 11 | DPORT MASK | FLOW ID MASK | INPUT LINE NO. 3 | 810-2 |
| 3 | SIP MASK | DIP MASK | SPORT 20 | DPORT MASK | FLOW ID MASK | INPUT LINE NO. 3 | 810-3 |
| 4 | SIP MASK | DIP MASK | SPORT 25 | DPORT MASK | FLOW ID MASK | INPUT LINE NO. 3 | 810-4 |
| 5 | SIP MASK | DIP MASK | SPORT 8 | DPORT MASK | FLOW ID MASK | INPUT LINE NO. 4 | 810-5 |
| 6 | SIP MASK | DIP MASK | SPORT 11 | DPORT MASK | FLOW ID MASK | INPUT LINE NO. 4 | 810-6 |
| 7 | SIP MASK | DIP MASK | SPORT 20 | DPORT MASK | FLOW ID MASK | INPUT LINE NO. 4 | 810-7 |
| 8 | SIP MASK | DIP MASK | SPORT 25 | DPORT MASK | FLOW ID MASK | INPUT LINE NO. 4 | 810-8 |

702

FIG. 34
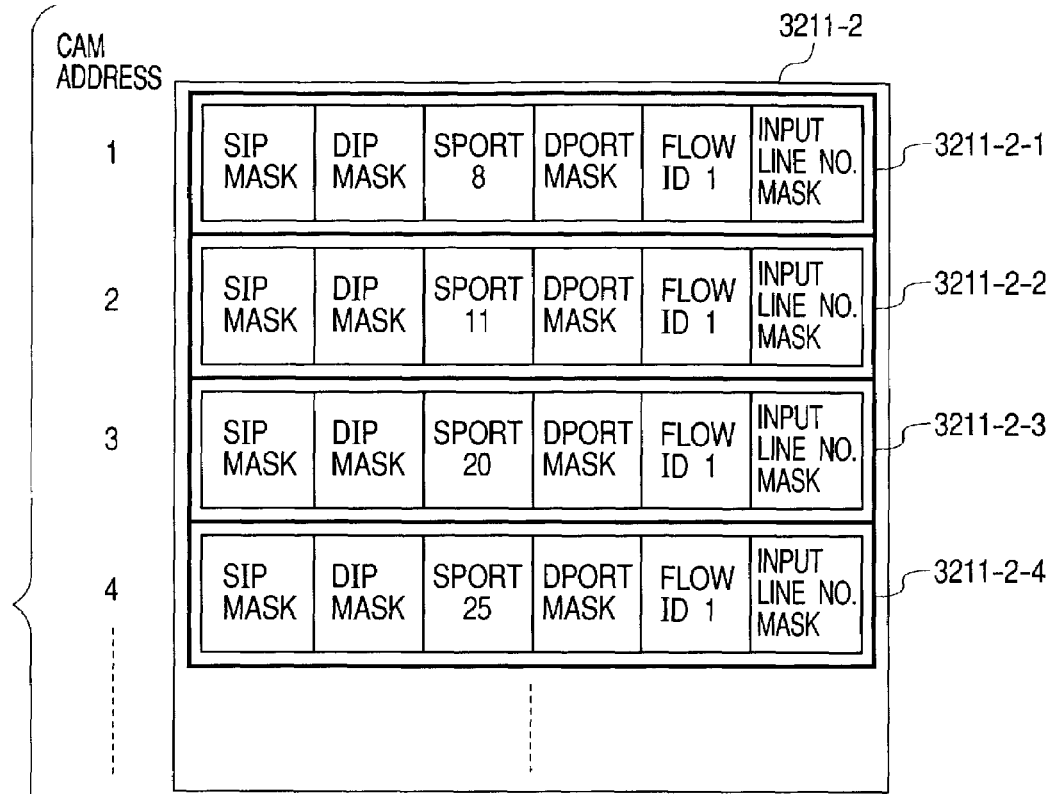
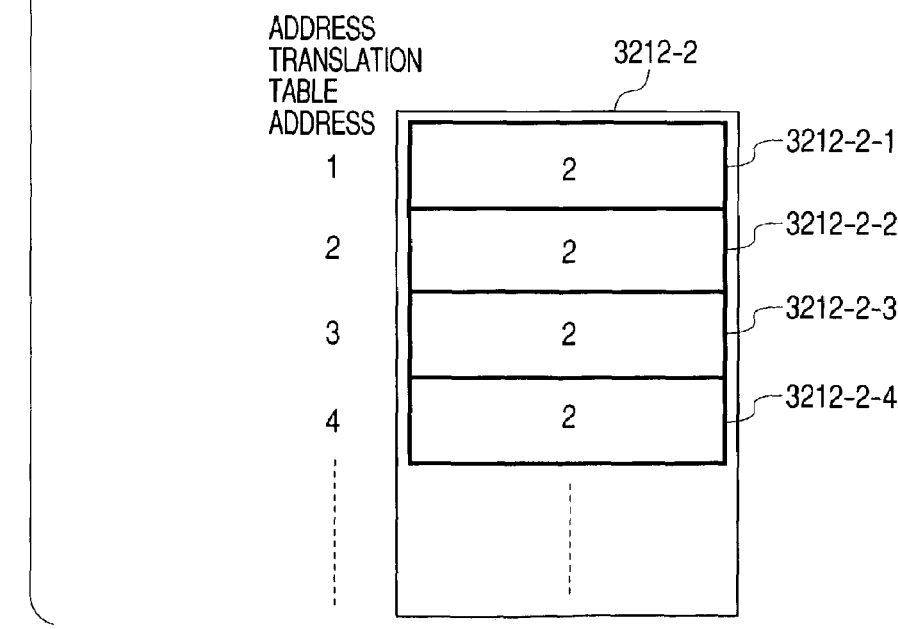

FIG. 35

Flow 1 { SIP any, DIP any, SPORT any, DPORT any, FlowID any, inport 3, New flowID 4 }
Flow 3 { SIP any, DIP any, SPORT any, DPORT any, FlowID any, inport 4, New flowID 4 }

FIG. 36

Priority { Flow ID 4 non-Priority }
Priority { Flow ID 3 Priority }
Priority { Flow ID 5 non-Priority }

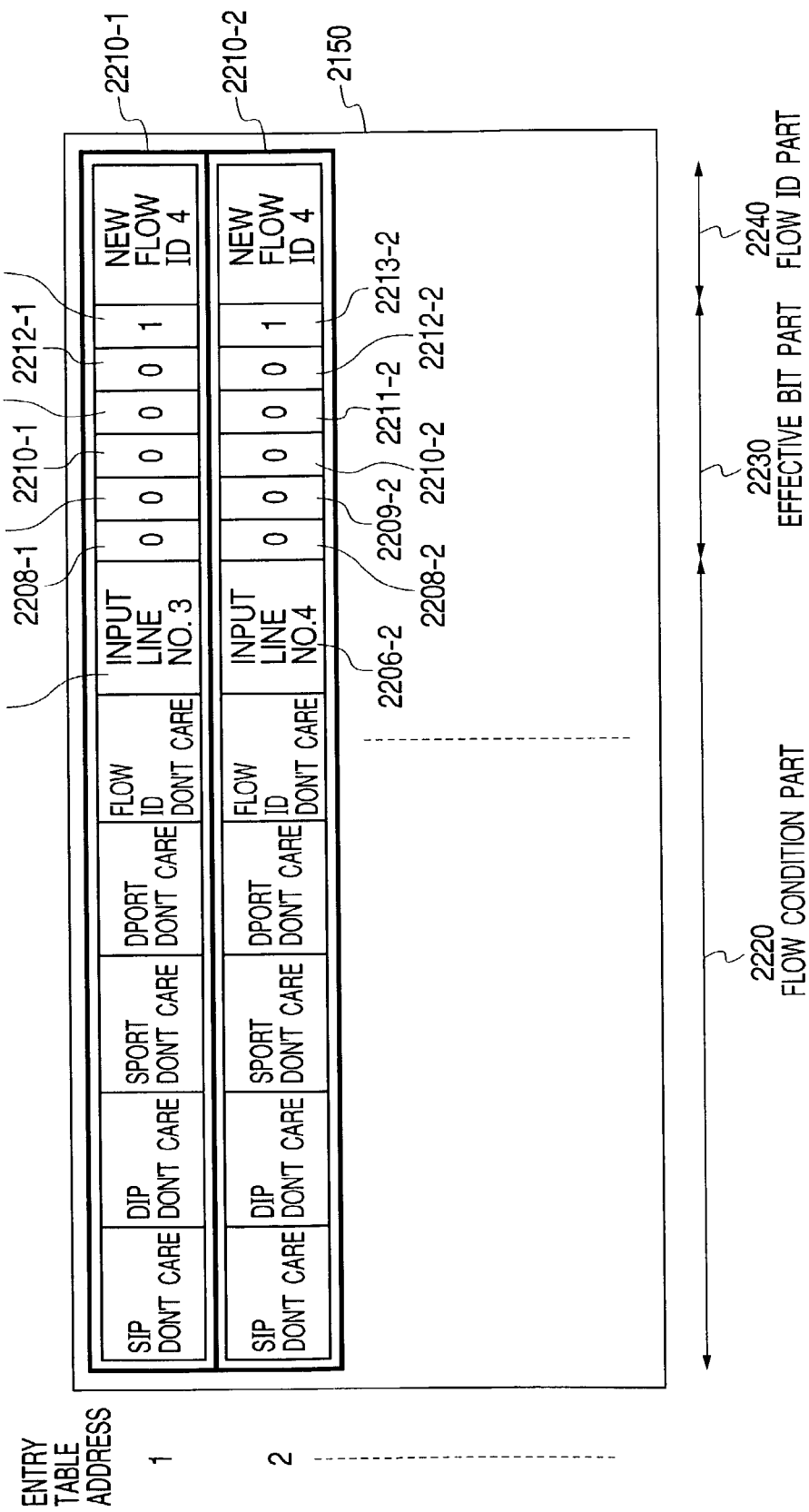

FIG. 39

Preflow 1  {SIP any, DIP any, SPORT any, DPORT any, FlowID any, inport3, NewflowID 1}
Preflow 2  {SIP any, DIP any, SPORT any, DPORT any, FlowID any, inport4, NewflowID 1}
Afterflow 1 {SIP any, DIP any, SPORT 08, DPORT any, FlowID 1, inport2, NewflowID 2}
Afterflow 2 {SIP any, DIP any, SPORT 11, DPORT any, FlowID 1, inport2, NewflowID 2}
Afterflow 3 {SIP any, DIP any, SPORT 20, DPORT any, FlowID 1, inport2, NewflowID 2}
Afterflow 4 {SIP any, DIP any, SPORT 25, DPORT any, FlowID 1, inport2, NewflowID 2}

FIG. 40

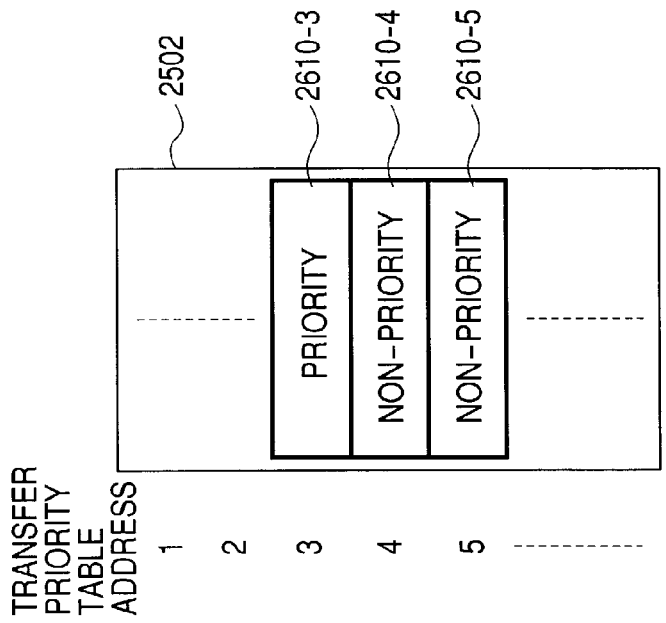

PACKET TRANSFERRING METHOD AND APPARATUS THAT EMPLOYS THE SAME

FIELD OF THE INVENTION

The present invention relates to a packet transferring method and an apparatus that employs the method.

BACKGROUND OF THE INVENTION

ATM network communications are connection type communications in which connections are preset. Such connection information as destination information, transfer priority information, bandwidth monitoring information, etc. corresponding to each connection is registered in each ATM of an ATM network. An ATM performs such processings as cell transferring, priority-based transferring, and bandwidth monitoring according to the connection information corresponding to the connection identifier written in each cell header.

On the other hand, IP network communications are connectionless type communications in which no connection is preset. Consequently, when enabling a router in an IP network to perform priority-based transferring and bandwidth monitoring, the router is required to have flow detecting means. A flow or a packet flow means a flow of a series of packets decided by a combination of header information in the header fields. A condition generated by a combination of header information in the header fields is referred to as a flow condition. The detecting of a packet flow as matching/unmatching with the above flow condition is referred to as flow detection. And, such packet processings as priority-based transferring, bandwidth monitoring, filtering, statistical information collecting, etc. performed with respect to each packet flow are referred to as flow processings. The flow detecting means detects a packet flow from the header information of a packet. The header information includes an IP address, etc. A router performs such flow processings as priority-based transferring and bandwidth monitoring according to the priority-based transferring information and the bandwidth monitoring information corresponding to each flow.

A router is also required to detect packet flows so as to filter the packets. In the case of the connection type communication, a connection is preset only for each permitted opposite party and the registration of connection is disabled for non-permitted opposite parties to prevent receiving cells from unexpected opposite parties. This is why the communication security is easily assured in the connection type communications. In the case of the connectionless type communication, however, packets are possibly received from all the terminals connected to the subject network. This is why packets are required to be filtered to discard those received from unexpected opposite parties via connectionless type communications.

A router is also required to have flow detecting means to collect statistic information of each flow. The statistical information items to be collected are, for example, the number of packets and the number of bytes inputted to each router, as well as those output from the router or those discarded by the router.

To keep the communication quality in an IP network, each router in this network is required to have the above described flow detecting means to be used for priority-based transferring of packets. When some of the routers in an IP network do not perform such priority-based transferring of packets, the communication quality is degraded by those routers thereby degrading the communication quality of the whole network. The flow detecting means, when it is provided for the backbone router located in the backbone of an IP network, becomes a bottleneck for fast transferring of packets, since the backbone router uses fast lines to handle many more packet flows than edge routers.

The Differentiated Service (Diffserv) technique disclosed in RFC2475 (hereinafter "Document 1") is used to solve this problem. Hereunder, the Diffserv is described with reference to FIG. 3. An edge router A326/B327 (referred to as a boundary node in the Document 1) located at the inlet of the internet 325, when receiving a packet from a site A321, B322, C323, D324, detects the flow based on such information items as the source/destination IP address, the source/destination port number, a protocol, etc. written in the TCP/IP header of the packet. The edge router A326/B327 then monitors the bandwidth used by the detected flow of packets to decide the transfer priority of the flow in the Internet 325. In the case of the IPv6 protocol, this information is written in the Traffic Class (TC) field of each packet. In the case of the IPv4 protocol, the information is written in the Differentiated Service Code Point (DSCP) field. The backbone router 328 (referred as the interior node in the Document 1) located at the backbone of the Internet 325 performs priority-based transferring of the flow referred as the Per Hop Behavior (PHB) according to the TC thereby keeping the communication quality in the Internet 325. When a network employs the Diffserv, only the edge routers A326 and B327 located at the inlet of the Internet 325 are required to have the flow detecting means respectively, while the backbone router 328 is not.

The flow detecting means that realizes this boundary node is described in, for example, "a flow identification method with the use of an contents addressable memory", shown in FIG. 15, written by Uga and others in a collection of lectures/papers at the 2000 comprehensive meeting of Denshi Jouhou Tsuushin Gakkai SB-4-2 (hereinafter "Document 2"). The flow detecting means that employs the technique described in the Document 2 includes a CAM (Contents Addressable Memory) 1501 for storing flow entries 1510-*j* (j=1 to M) (each describing a flow condition generated by a combination of the header information, etc.) as well as a retrieval result retaining table 1502 for storing retrieval result entries 1520-*j* (each describing an operation corresponding to a flow entry 1510-*j*). The flow detecting means, when detecting a packet flow, makes a comparison of matching/unmatching between the contents of the packet header information and of the flow entry 1510-*j*. Then, the flow detecting means writes TOS (=DSCP) in each packet. The TOS is described in the retrieval result entry 1520-*j* corresponding to a matching flow entry 1510-*j*.

The backbone router of a network that employs the Diffserv is not required to have such flow detecting means to maintain the communication quality. However, the backbone router is required to have the flow detecting means to perform other flow processings (ex., collecting of statistical information).

Hereunder, why the backbone router is required to have such the flow detecting means is described in detail with reference to FIG. 3. Sites A321 and C323 shown in FIG. 3 both belong to a corporation A. This corporation A uses the Internet 325 to transfer data from the site A 321 to the site C323 at a transfer rate of 10 Mbits/sec. Similarly, sites B322 and D324 both belong to a corporation B and this corporation B uses the Internet 325 to transfer data from the site B322 to the site D324 at a transfer rate of 10 Mbits/sec. On the other hand, the Internet 325 guarantee transferring of packets at a rate of 10 Mbits/sec and confirms with the managers of the corporations A and B that the internet service contracts with them fulfill their transfer rate requirements.

When the Internet 325 employs the technique disclosed in the Document 1, each router acts as follows. When the edge router A326 receives a packet from the site A321/B322, the flow detecting means of the edge router A326 identifies the source site from the source IP address written in the packet and monitors the bandwidth used by the site. When the packet uses a bandwidth whose transfer rate is below the internet service contracted one (10 Mbits/sec), the flow detecting means writes the value of "priority" in the TC of the packet. When the packet flow uses a bandwidth whose transfer rate is over the internet service contracted one, the flow detecting means writes the value of "non-priority" in the TC. Respective packets having "priority" written in TC are referred to as priority packets and respective packets having "non-priority" written in TC are referred to as non-priority packets. The edge routers A326 and B327 as well as the backbone router 328 in the Internet 325 perform priority-based transferring according to the TC value respectively to assure the transferring of priority packets as desired. In addition, each of those routers distinguishes among TCs (i.e., transfer priority levels) to count such statistical information items as the number of packets/bytes discarded for each of the source sites. The internet service provider ("ISP"), since no priority packet is discarded during transferring, can assure the managers of the corporations A and B of the fulfillment of their internet service contracts.

The backbone router 328 and the edge router B327 are not required to have any flow detecting means to conduct priority-based transferring of packet flows (i.e., to maintain the communication quality). To collect statistical information, however, those routers are required to have such means to detect each packet flow from the source IP address repetitively so as to identify each source site. At this time, the flow detecting means of the backbone router that uses fast lines often becomes a bottleneck that degrades the transfer performance of the network. The Document 2 does not describe any method to omit the flow detecting means from the backbone router 328.

Routers that employ the above conventional technique have a problem that the number of flow detecting means increases with the increase of the number of flow processings. Generally, the cost of a router increases as the number of flow detecting means increases. The edge router A326 is required to identify each site and monitor the bandwidth used by the site, as well as to collect the number of packets/bytes discarded for each TC. And, even when the edge router A326 detects a flow and identifies the source site through bandwidth monitoring, the edge router 326 is still required to detect each flow from the source IP address repetitively so as to identify the source site and collect statistical information. This is why the number of flow detecting means increases when the number of flow processings increases in each router according to the conventional technique.

In addition to the above problem, the conventional technique has another problem that it is impossible to perform bandwidth monitoring and statistical information collecting with respect to each flow bundle consisting of a plurality of flows if the flows in each bundle can not be distinguished from each other. On the other hand, each router is required to perform such bandwidth monitoring for each flow bundle consisting of a plurality of flows as described above. In the case of statistical information collecting, each router is also required to count the sum of byte lengths of input/output packets and the number of input/output packets, as well as those discarded therefrom with respect to each flow bundle.

Next, a problem of each router employing the technique described in the Document 2 is described in detail with reference to FIG. 2. Via the IP network shown in FIG. 2, sites A210 and B220 of a corporation are connected to a site C230 of the same corporation. An internet service contract is made between the internet service provider and the manager of the corporation network so as to transfer packet flows from the site A210 or B220 to the site C230 at a rate of 10 Mbits/sec. The packet flow output from the site A210 is designated as the flow 1 and the packet flow output from the site B220 is designated as the flow 2. The terminals A212 and B213 of the site A210 as well as the terminals C222 and D223 of the site B220 send packets to the terminal E232 of the site C230 via the Internet 200. The edge router A202 located at an edge of the Internet 200 monitors the bandwidths of the packets sent from both of the sites A210 and B220 at a rate of 10 Mbits/sec.

Assuming that the edge router A202 employing the technique described in the Document 2 monitors the bandwidth of the packets in the flow 1 at a rate of 10 Mbits/sec, the edge router A202 sets the identifier of the line 206 connected to a gateway router A211 in the flow entry 1510-1. The edge router A202 then initializes such packet arrival history information as the arrival time, etc. of the previous packet in the retrieval result entry 1520-1 and updates the bandwidth monitoring information as a value corresponding to 10M bits/sec. When a packet of the flow 1 is inputted, the edge router A202 refers back to the packet arrival history information and the monitoring bandwidth information in the retrieval result entry 1520-1 (corresponding to the flow entry 1510-1 to monitor the bandwidth and update the packet arrival history information).

Next, the monitoring of the bandwidths of the flows 1 and 2 of packets is described below. An OR operation of flow conditions cannot be set in the flow entry 1510 such that it is impossible to describe a flow of packets inputted via the line 206 and a flow of packets inputted via the line 207 in one flow entry 1510-*j*. However, if the line 206 and the line 207 are described as flow conditions in two flow entries 1510-1 and 1510-2, the packet arrival history information to be updated in will differ between flow entries 1510-1 and 1510-2, depending on the input site. To monitor the bandwidths of both flows 1 and 2 simultaneously, it is required to refer back to the same packet arrival history information and update the information regardless of the input site. Nevertheless, routers that employ the conventional technique 1 cannot monitor the bandwidth of each flow bundle consisting of a plurality of flows as described above.

Next, how an edge router collects statistical information is described with reference to FIG. 2. The edge router A202 shown in FIG. 2 counts the sum of bytes in each packet and/or the number of packets output from the sites A210 and B220 collectively. The internet service provider reads those statistical information items periodically from the edge router A202 at the management terminal 205 to use those information items, for example, for accounting.

First, how the edge router A202 employing the technique described in the Document 2 counts a sum of bytes in each packet and/or the number of packets in the flow 1 is described. At this time, the edge router A202 sets an identifier for the line 206 connected to the gateway router A211 in the flow entry 1510-1 so as to identify the flow 1. In addition, the edge router A202 initializes the retrieval result entry 1520-1 to "0". The entry 1520-1 is composed of a byte counter that counts a sum of bytes in each packet and a packet counter that counts the number of packets. Receiving a packet of the flow 1, the edge router A202 reads the values of the byte counter and of the packet counter (corresponding to the flow entry 1510-1) and adds "1" and the number of bytes in the received packet to the values of the counters respectively. The edge router A202 then writes the updated values of the counters in the same retrieval result entry 1520-1.

Next, the counting of the sum of bytes in each packet and/or of the number of packets in each of the flows 1 and 2 collectively is described. Because the flow entry 1510-j cannot describe the logical sum (OR) of flow conditions, it is impossible to describe a packet flow inputted via the line 206 and a packet flow inputted via the line 207 in one flow entry 1510 as discussed above. In addition, if two flow entries 1510-1 and 1510-2 in which lines 206 and 207 are described as flow conditions are set for describing those packet flows, the edge router A202 refers back to wrong byte and packet counters thereby updating the counters with wrong values. This is why each router employing the conventional technique 1 cannot count a sum of bytes in each input/output packet and/or the number of input/output packets in each flow with respect to each flow bundle as discussed above. As an example, there are only two sites sending out packet flows in FIG. 2. There might be more sites in actual operation. When the number of sites increases, the management terminal 205 is required to read more statistical information from the edge router A202 such that the capacity of the transmission bandwidth between the management terminal 205 and the edge router A202 and/or the capacity of the memory of the management terminal 205 for storing the statistical information becomes insufficient. Consequently, the edge router A202 is also required to collect summarized statistical information.

While the technique described in the Document 2 fails to solve all the mentioned problems, the technique described in the Document 1 also fails to solve a problem that bandwidth monitoring and statistical information collecting with respect to each flow bundle can not be described in the flow entry.

SUMMARY OF THE INVENTION

In an aspect of the present invention, the packet processing method includes two steps. In the first step, an edge router decides the flow ID that is an identifier of a packet flow from at least one of the information items written in the packet header to write the flow ID in the packet. In the second step, the backbone router located downstream from the edge router performs at least one of such processings as bandwidth monitoring, statistical information collecting, filtering, and priority-based transferring according to the flow ID. The backbone router is not required to have any flow-detecting means. Even when the backbone router has the flow detecting means, the flow detecting means will not lower the throughput of the whole network.

Furthermore, in another aspect of the present invention, a router includes the flow detecting means used to decide a flow ID that is an identifier of an inputted packet from at least one of the information items written in the packet, and a packet processing part for performing at least one of such processings as bandwidth monitoring, statistical information collecting, filtering, and priority-based transferring according to the flow ID. The router is not required to have another flow detecting means even when the number of flows to process increases.

In an embodiment of the present invention, the flow detecting means is provided with a CAM, which has a plurality of flow entries, each consisting of at least one of the information items written in each packet header. The flow detecting means can thus compare packet header information of each inputted packet and each of the flow entries to output an address matching with each matching flow entry. The flow detecting means is also provided with an address translating part that translates a plurality of matching addresses into one flow ID. When the same flow ID is assigned to a plurality of flows, the router can perform such processings as bandwidth monitoring and statistical information collecting with respect to each flow bundle consisting of a plurality of flows.

Furthermore, in still another aspect of the present invention, the flow detecting means is provided with an entry table containing a plurality of entries, each consisting of a flow condition composed of at least one of the information items written in each packet header and a flow ID. The flow detecting means then checks matching/unmatching between the flow condition in the entry and the packet header upon an input of the packet header information of each inputted packet to decide the flow ID described in the matching entry as the flow ID of the inputted packet.

Those and other problems to be solved by the present invention, as well as the means used to solve those problems will become more apparent based upon the following detailed description and drawing.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 31 shows inputted items of each flow entry in the CAM;

FIG. 34 shows inputted items of each flow entry in the CAM and values written in each registered flow ID in the address translation table in the pre-stage flow detecting means of FIG. 32.

FIG. 35 shows an input screen of a management terminal for setting a flow condition and a flow ID corresponding to the flow condition;

FIG. 36 shows an input screen of the management terminal for setting a transfer priority level corresponding to each flow ID;

FIG. 38 shows inputted items of the entry table in response to a command input shown in FIG. 35 from the management terminal;

FIG. 39 shows an input screen of the management terminal for inputting a flow condition and a flow ID corresponding to the flow condition; and FIG. 40 shows inputted items in the transfer priority table in response to a command input shown in FIG. 36 from the management terminal.

DETAILED DESCRIPTION OF THE PREFERRED EMBODIMENTS

At first, an embodiment of a router of the present invention is described with reference to FIGS. 1, 4 through 6, and 28.

Figure 1:
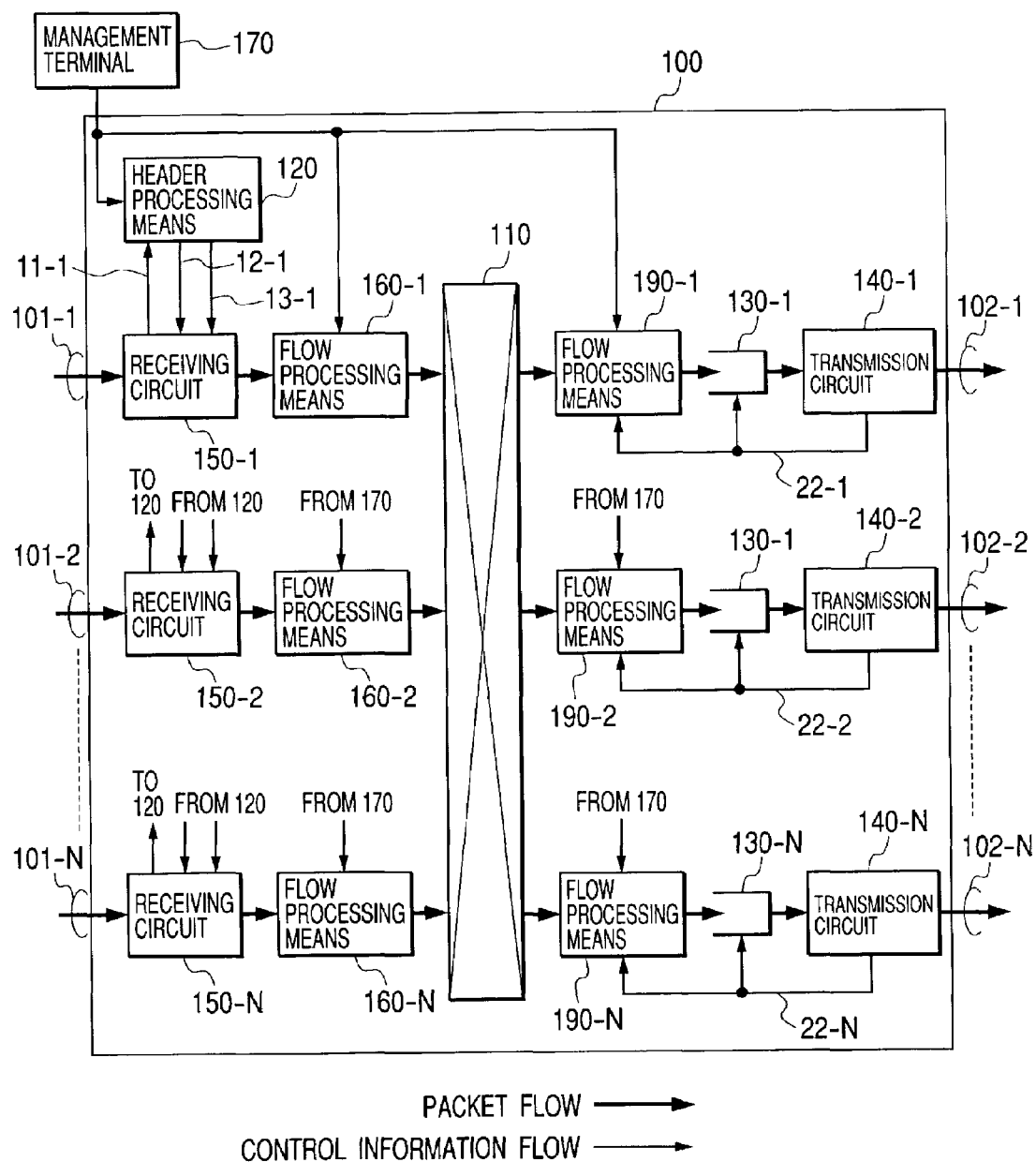
FIG. 1 is a block diagram of a router 100 of the present invention.

FIG. 1 shows a block diagram of the router 100. The router 100 comprises a plurality of (N) input lines 101-$i$ (i=1 to N) used to input packets, a receiving circuit 150-$i$ used to receive the packets, a header processing means 120 used to decide an output line number that is an identifier of an output line 102-$i$ for outputting packets and deciding a flow ID that is an identifier of a flow or a flow bundle, a flow processing means 160-$i$ used to perform such processings as bandwidth monitoring, statistical information collecting, and filtering according to this flow ID, packet relaying means 110 used to switch packets between output lines according to an output line number, a flow processing means 190-$i$ used to perform such processings as priority-based transferring and statistical information collecting according to a flow ID, a sending side buffer 130-$i$, a sending circuit used to send packets, and an output line 102-$i$ used to output packets. A management terminal 170 is connected to the router 100. The management terminal 170 sets up a table in each of the header processing means 120, the flow processing means 160-$i$, and the flow processing means 190-$i$. In FIG. 1, the header processing means 120 is connected only to the receiving circuit 150-1 for simplification. Actually, however, the header processing means 120 is connected to every receiving circuit 150-$i$. Similarly, while the management terminal 170 is connected only to the flow processing means 160-1 and the flow processing means 190-1 in FIG. 1 for simplification, the terminal 170 is actually connected to all of the flow processing means 160-$i$ and the flow processing means 190-$i$.

Figure 2:
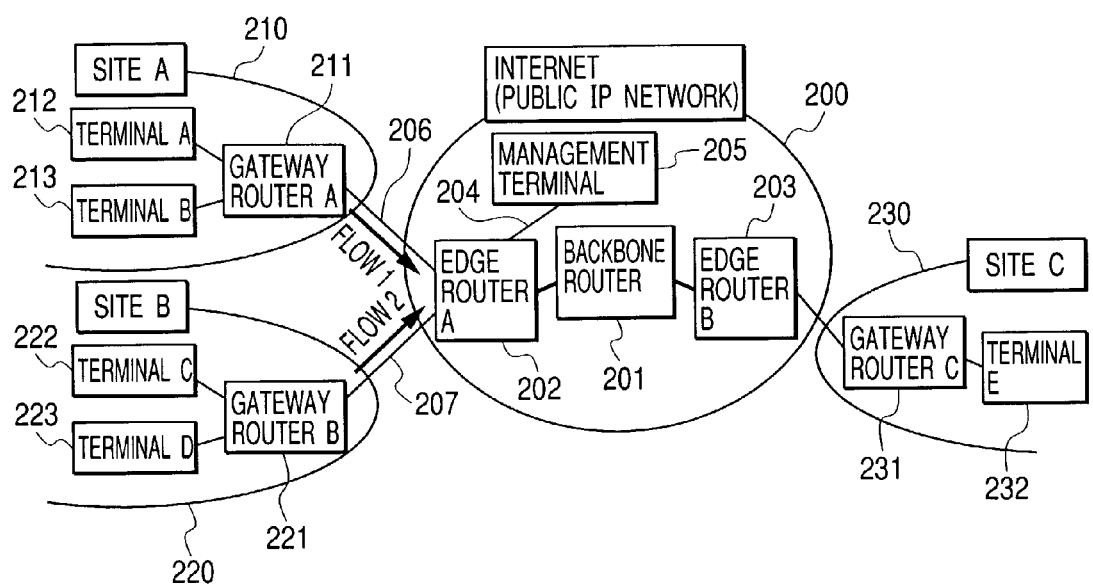
FIG. 2 is an IP network assumed by the present invention.
Figure 3:
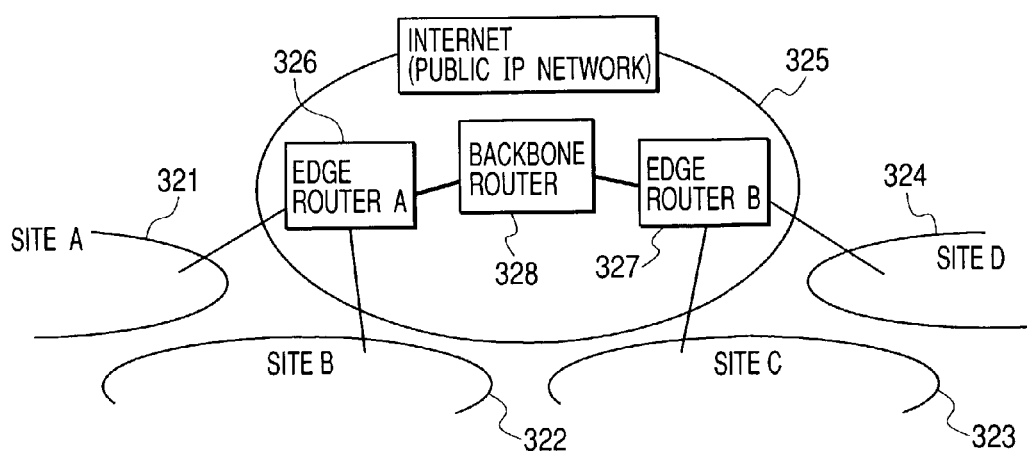
FIG. 3 is another IP network assumed by the present invention.
Figure 4:
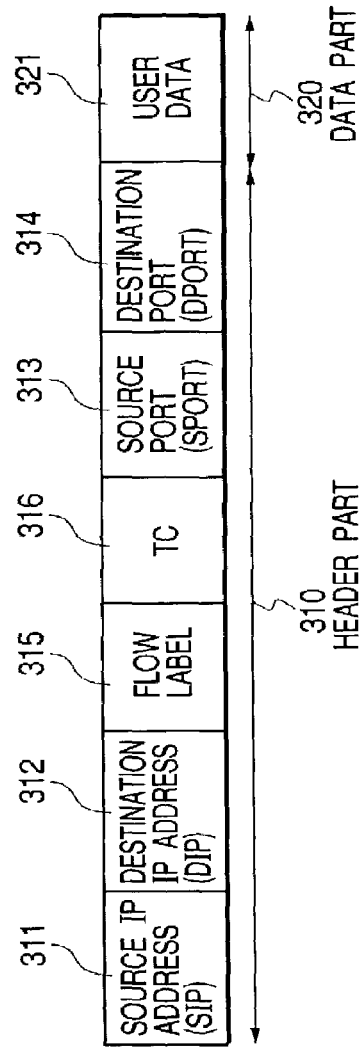
FIG. 4 is a conventional packet format used in an IP network.

FIG. 4 shows an example of the packet format used in the IP network shown in FIG. 2 or 3. This format consists of a header part 310 and a data part 320. The header part 310 consists of a source IP address (hereinafter "SIP") 311, a destination IP address (hereinafter "DIP") 312, a source port (hereinafter "SPORT") 313 that represents a high-order application program, a flow label 315, and a TC 316 that represents a transfer priority level in an IP network. A packet source writes a unique value in the flow label 315 with respect to each packet of one packet flow and writes "0" in the flow label 315 of other packets that does not belong to the packet flow so as to send out the relevant packets.

The data part 320 consists of user data 321. The header part 310 stores the above described information items, as well as information such as the upper layer protocol of the IP protocol. The information is used for conducting the processings to be described later accordingly. In the format shown in FIG. 4, the transport layer protocol is the TCP (Transmission Control Protocol) or the UDP (User Datagram Protocol) and the network layer protocol is the IPv6 (Internet Protocol version 6) described in the RFC2460. For example, the network layer protocol may be the IPv4 (Internet Protocol version 4). When the IPv4 is used, the length of the DIP 312 is changed from 128 bits to 32 bits and the flow label 315 is omitted.

Figure 5:
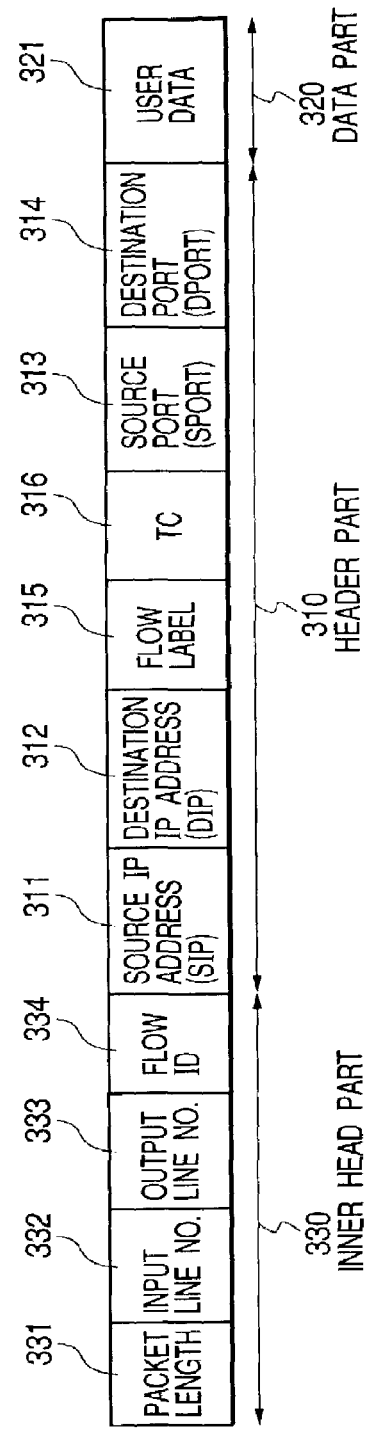
FIG. 5 is a packet format used in the router 100 of the present invention.

FIG. 5 shows an example of the packet format used in the router 100 of the present invention. This format is a variation of the IP packet format in FIG. 4. It has an inner header part 330. This inner header part 330 consists of a field of packet length 331 that represents a byte length of respective packets, a field of an input line number 332 that is the identifier of an input line of a subject packet flow, a filed of an output line number 333 that is the identifier of an output line from which a subject packet flow is output, and a field of a flow ID 334 that is the identifier of a flow or a flow bundle. The flow ID 334 is a piece of specific information of the present invention. The value of the packet length 331 is used for bandwidth monitoring and/or for statistical information collecting.

Figure 28:
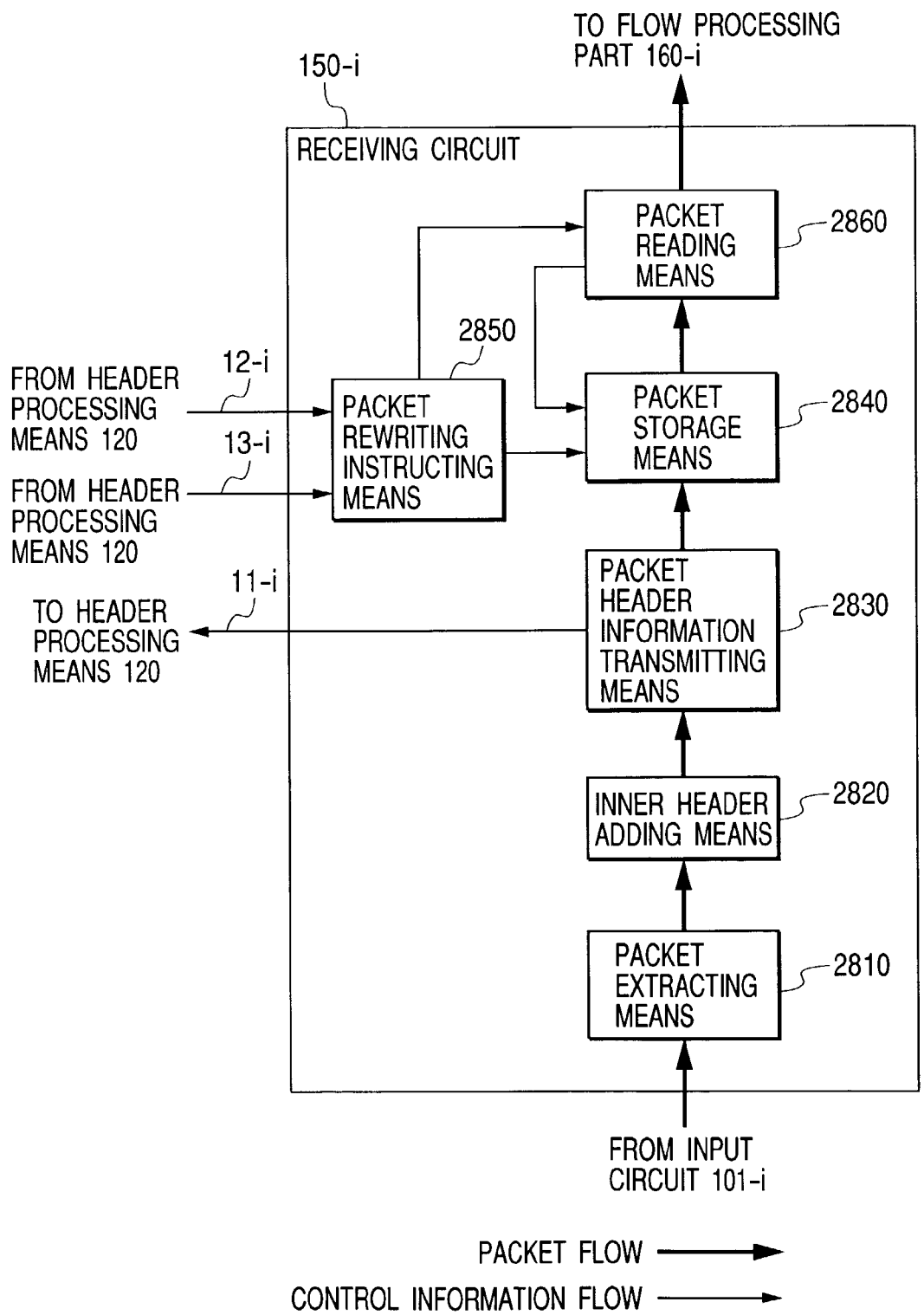
FIG. 28 is a block diagram of a receiving circuit of the present invention.

In FIG. 28, when a packet is inputted to the input line 101-$i$, the packet extracting means 2810 of the receiving circuit 150-$i$ extracts the packet and sends it to the inner header adding means 2820. The inner header adding means 2820 adds an inner header part 330 to the packet after counting the byte length of the packet, then copies the value in the field of the packet length 331, the identifier ("=i") of the input line 101-$i$ to which the packet is inputted in the input line number 332, and the value of the flow label 315 in the flow ID 334 respectively. After this, the inner header adding means 2820 sends the packet to the packet header information sending means 2830. The packet header information sending means 2830 then sends the packet header information 11-$i$ consisting of the inner header part 330 and the header part 310 to the header processing means 120 and sends the packet to the packet storing means 2840. The packet storing means 2840 stores this packet temporarily. At this time, the value held in the output line number 333 is meaningless.

Figure 6:
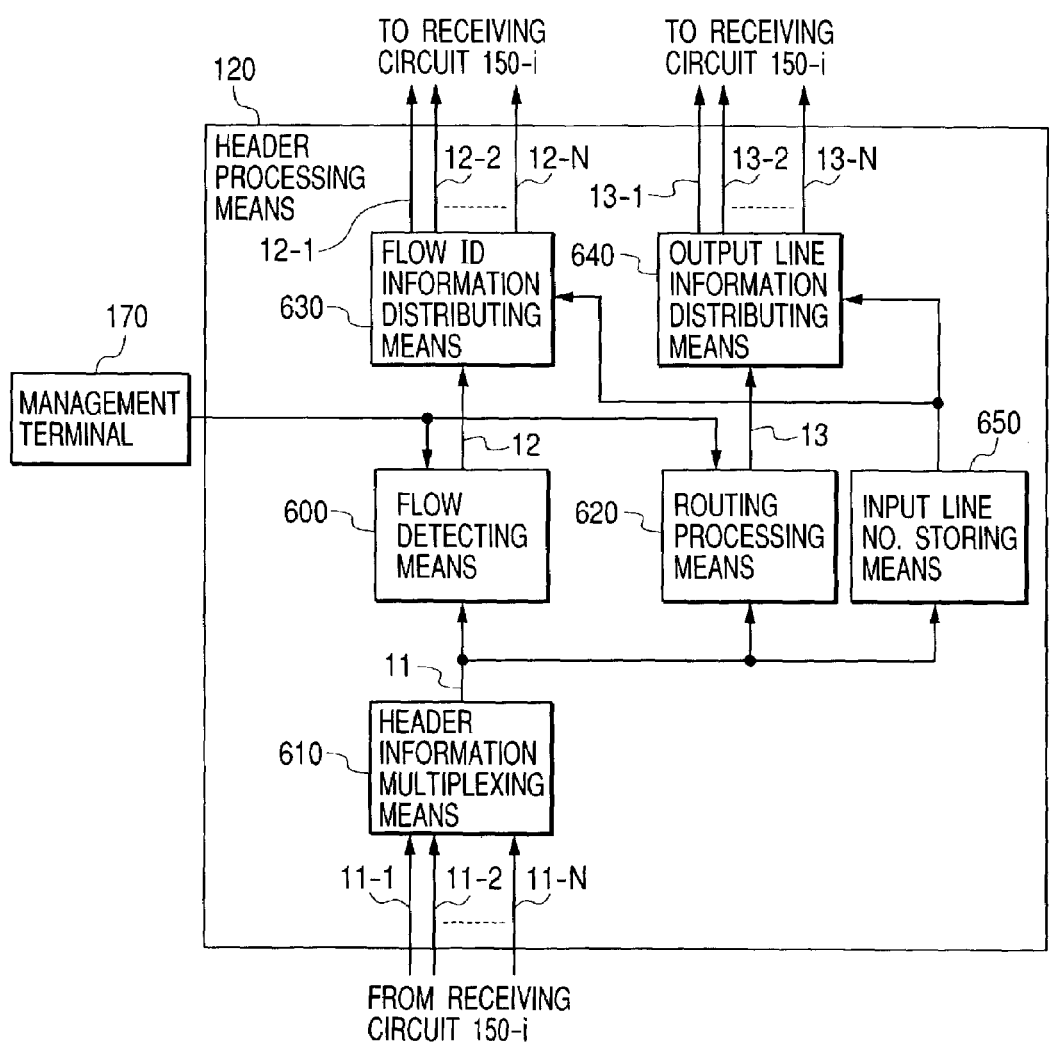
FIG. 6 is a block diagram of a header processing means of the present invention.

FIG. 6 shows a block diagram of the header processing means 120. Receiving the packet header information 11-$i$, the header processing means 120 multiplexes this information, then sends the multiplexed packet header information 11 to the flow detecting means 600, the routing processing means 620, and the input line number storage means 650 respectively. The input line number storage means 650 stores the input line number 332, and the flow detecting means 600 detects a packet flow from the packet header information 11. When the packet source sets its unique value in the flow label with respect to respective flows to be sent out, the flow detecting means 600 detects the flow from both the SIP 311 and the flow label 315. When the packet source writes "0" in the flow label 315 of a packet to send out in a packet flow, the flow detecting means 600 detects the flow from the SIP 311, the DIP 312, the SPORT 313, the DPORT 314, the input line number 332, and the flow ID 334 (=flow label 315). In addition, the flow detecting means 600 sends the detected flow identifier to the flow ID information distributing means 630 as flow ID information 12. The flow ID information distributing means 630 then sends the flow ID information 12-$i$ to the receiving circuit 150-$i$ corresponding to the input line number 332 stored in the input line number storage means 650. On the other hand, the routing processing means 620 decides the identifier of the output line 102-$i$ from which a packet flow is output (i.e., the output line number from the DIP 312 written in the packet header information 11) and sends this identifier to the output line information distributing means 640 as packet output line information 13. The output line information distributing means 640 then sends the packet output line information 13-$i$ to the receiving circuit 150-$i$ corresponding to the input line number 332.

Referring back to FIG. 28, a packet rewriting instructing means 2850 of the receiving circuit 150-$i$ writes the flow ID information 12-$i$ as the flow ID 334 of the respective packets stored in the packet storing means 2840 and writes the packet output line information 13-$i$ as the output line number 333. In addition, the packet rewriting instructing means 2850 notifies the packet reading means 2860 of the end of writing, and the packet reading means 2860 sends the packets stored in the packet storing means 2840 to the flow processing means 160-$i$. The flow processing means 160-$i$ stores the received packets in itself, then performs such processings as bandwidth monitoring, statistical information collecting, and filtering according to the flow ID 334, then transfers the packets to the packet relaying means 110 in FIG. 1. The details of the flow processing means 160-$i$ is described later. The packet relaying means 110 switches packets among output lines according to the output line number 333 so as to send those packets to the flow processing means 190-$i$. The flow processing means 190-$i$ then stores the received packets in itself, then performs such processings as priority-based transferring and statistical information collecting according to the flow ID 334 so as to send the packets to the sending side buffer 130-$i$. The sending side buffer 130-$i$ stores packets received at a rate higher than the transfer rate of the bandwidth of the output line 102-$i$ so as to prevent discarding of packets. When receiving packets at a rate higher than the transfer rate of the bandwidth of the output line 102-$i$ for an excessively long time, the flow processing means 190-$i$ discards the overflowing packets. The sending circuit 140-$i$ sends a packet sending start signal 22-$i$ to the sending side buffer 130-$i$ so as to read packets from the sending side buffer 130-$i$ in accordance with the transfer rate of the bandwidth of the output line 102-$i$. Receiving this signal, the sending side buffer 130-$i$ sends packets to the sending circuit 140-$i$. The sending circuit 140-$i$ writes the value of the flow ID 334 in the flow label 315, then deletes the inner header means 330 from the packet to be sent to the output line 102-$i$. The router located in the downstream of the router 100 processes the flow according to the flow label 315.

Figure 30:
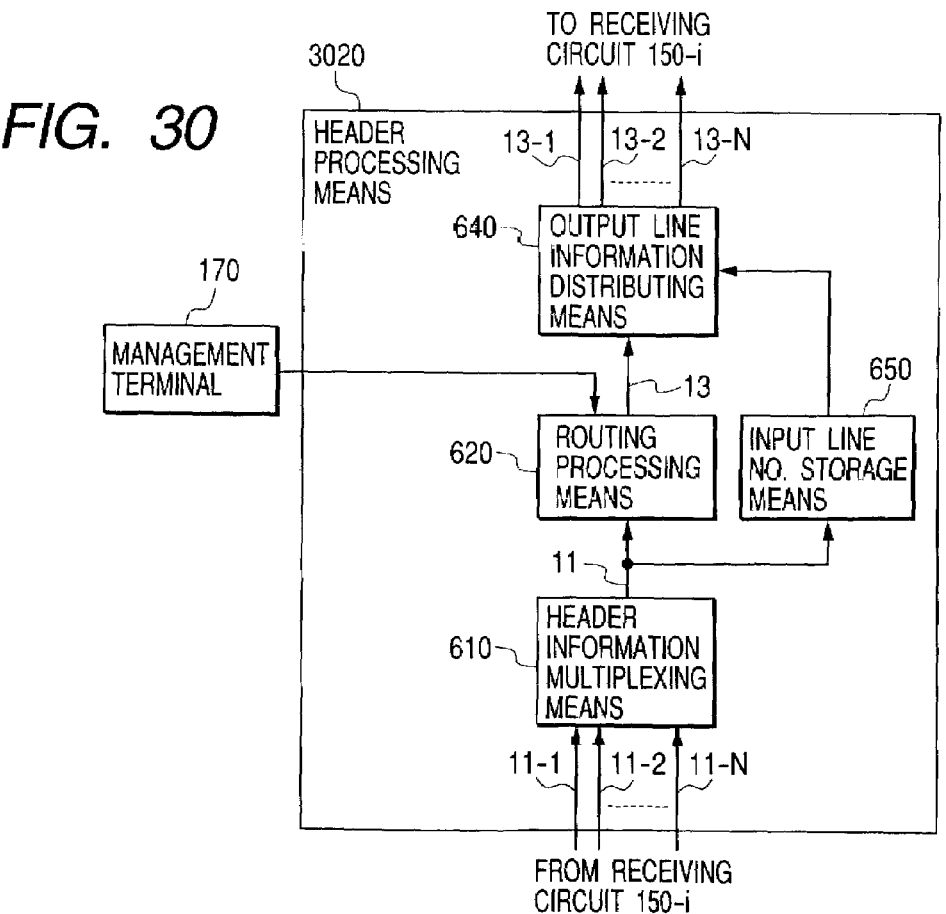
FIG. 30 is a block diagram of a header processing means of a downstream router of the router 100 in FIG. 1.

FIG. 30 shows the header processing means 3020 of the router located in the downstream of the router 100. The direction towards the packet source is defined as the upstream and the direction towards the packet destination is defined as the downstream. The header processing means 3020 is the same as the header processing means 120 in configuration except that the flow detecting means 600 and the flow ID information distribution means 630 are omitted from the header processing means 3020. Each router located in the downstream of the router 100 has no flow detecting means 600 or flow ID information distributing means 630 to cut cost.

When a packet source writes a unique value in the flow label to send each packet flow, the flow detecting means 600 of the router 100 condenses a total of 148 bits (including a source IP address (SIP) of 128 bits and a flow label 315 of 20 bits) in the field of the flow label 315 (20 bits). When no value is written in the field of the flow label 315, the flow detecting means 600 must identify the flow from a combination of SIP, DIP, SPORT, etc. such that a bit field larger than the above is condensed.

When a small bit width is set for the flow ID and the router 100 is provided with a table for storing transfer priority information, bandwidth monitoring information, statistical information, and filtering information for each flow ID, there is no need to increase the number of flow detecting means to cope with an increase of the number of flow processings. In this case, the router 100 is required to have each flow ID as a unique value for the router 100.

Each router can be provided with a table for storing transfer priority information, bandwidth monitoring information, statistical information, and filtering information for each flow ID if it has a space ($2^{20}$=1M space) that can be identified by the flow label 315 (20 bits). Consequently, each router located in the downstream of the router 100 is only required to have those tables but not required to have the flow detecting means 600. When an edge router rewrites only specific bit/bits of the 20 bits and the flow processing means of a router in a network refers to only this bit/these bits, the table size can be further reduced. In this case, the router 100 is required to assign the value of the flow label 315 as a unique value in the network. And, when a packet source writes a unique value in itself for each packet flow to be sent out therefrom, the backbone router is required to combine the flow label 315 and the SIP to detect the packet flow, since the value is not unique in the network.

Assume now that the router 100 is to be used instead of the edge router A326 shown in FIG. 3. The sites A321 and C323 belong to networks of a corporation A, and this corporation A uses services of the Internet 325 in which data is transferred from the site A321 to the site C323 at 10M bits/sec. Similarly, the sites B222 and D324 belong to the networks of a corporation B and this corporation B uses services of the Internet 325 in which data is transferred from the site B322 to the site D324 at 10M bits/sec. The internet service provider 325 guarantees the managers of the corporations A and B of the fulfillment of the internet service contracts of data transfer at 10M bits/sec.

The edge router A326, when receiving a packet from the site A321/B322, identifies the source site from the SIP 311 and monitors the bandwidth at 10M bits/sec for each site. The edge router A326 writes whether the internet service contracted bandwidth is "fulfilled"/"not fulfilled" and the source site information in a unique flow label in the Internet 325, then sends the packet to the object site. For example, the edge router A326 writes "1" in each packet received from the site A321 and decided as "fulfilled" and "2" in each packet decided as "not fulfilled". Similarly, the edge router A326 writes "3" in each packet received from the site B322 and decided as "fulfilled" and "4" in each packet decided as "not fulfilled".

The backbone router 328 and the edge router B327 in the Internet 325 perform priority-based transferring and statistical information collecting according to the value written in the flow label to assure transferring of priority packets, as well as count such statistical information as the number of discarded packets/bytes in packet with respect to each source site by distinguishing packets between transfer "priority" and "non-priority". The internet service provider 325, when no priority packet is discarded in such way, can assure the managers of the corporations A and B of the fulfillment of their internet service contracts. The backbone router 328 and the edge router B327 are required to have the flow processing means 160-$i$ for performing priority-based transferring and statistical information collecting according to the flow ID 334, but not required to have the flow detecting means 600.

While a description has been made for a case in which the flow ID 334 is written in the flow label 315, the flow ID 334 may be written in another field, for example, in the TC 316. Although the TC is information for indicating a transfer priority level in a network, writing the flow ID 334 in the TC 316 would not raise a problem if each router in the subject network functions in accordance with the description of the identifier in the TC 316 of a flow or a flow bundle. In this case, the inner header adding means 2820 of each router located in the downstream of the router 100 of the present invention copies the TC 316 in the field for the flow ID 334 such that the flow detecting means can refer to the identifier of the flow or the flow bundle. Similarly, the flow ID 334 may be written in any field other than the TC field or being incorporated with the TC in another field. The description has been made for a case that the network layer protocol is the IPv6 since the IPv4 uses no flow label. If the IPv4 is adapted, the information of the flow ID 334 can be written in the TC 316 (referred to as DSCP in the IPv4) or in another field.

Figure 7:
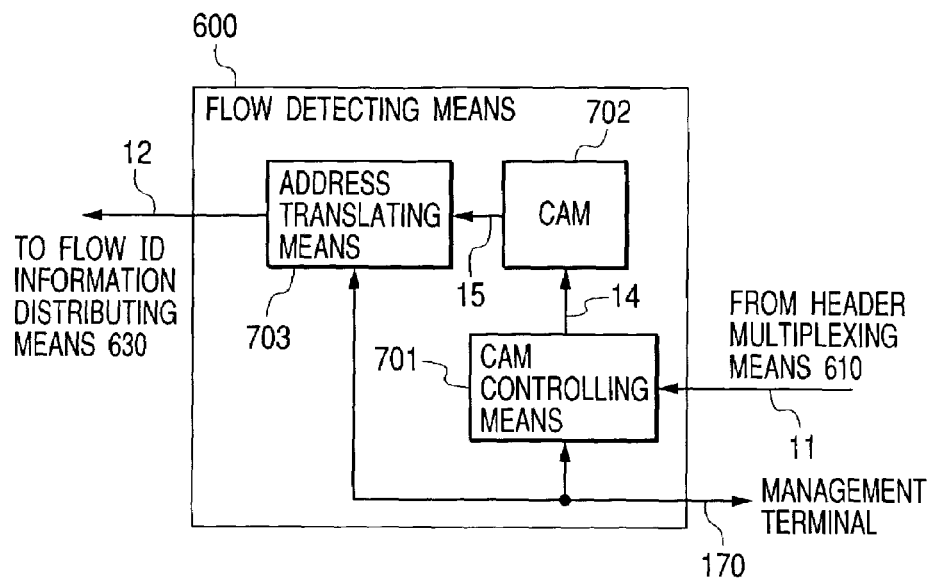
FIG. 7 is a block diagram of a flow detecting means of the present invention.
Figure 8:
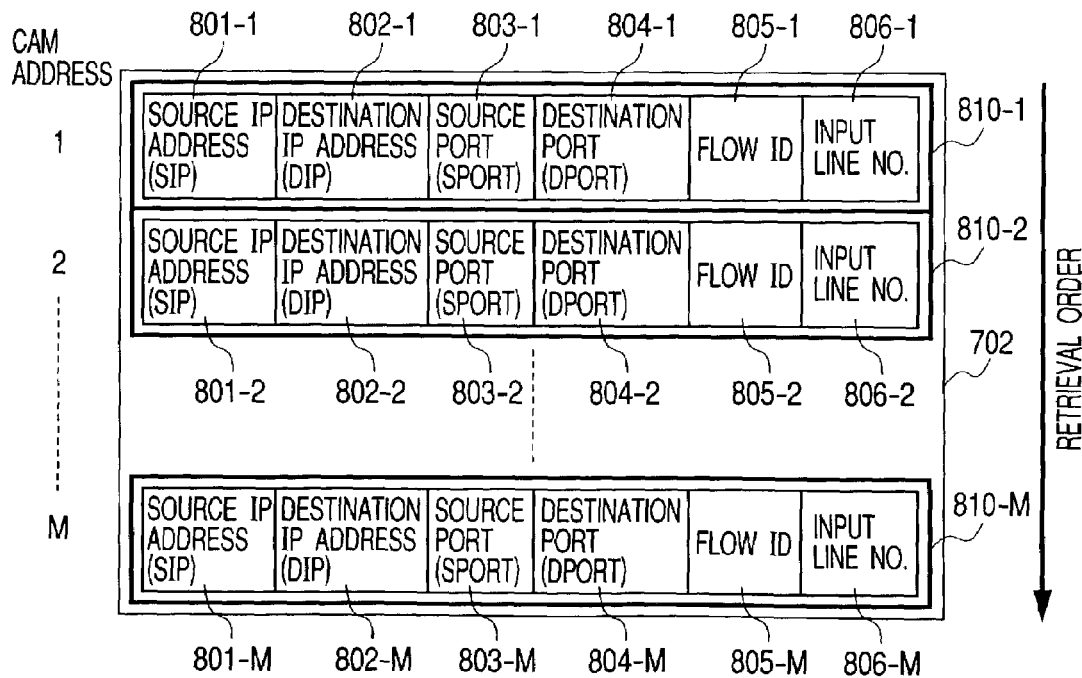
FIG. 8 is a CAM format of the present invention.

Next, the operation of the flow detecting means 600 is described in detail with reference to FIGS. 7 through 10. FIG. 7 shows a block diagram of the flow detecting means 600. A CAM controlling means 701 sends the SIP 311, the DIP 312, the SPORT 313, the DPORT 314, the flow ID 334, and the input line number 332 written in the packet header information 11 to the CAM 702 as flow detection key information 14. FIG. 8 shows a format of the CAM 702. The CAM 702 consists of flow entries 810-$j$ ($j$=1 to M), each describing a flow condition. A flow entry 810-$j$ consists of fields of SIP 801-$j$, DIP 802-$j$, SPORT 803-$j$, DPORT 804-$j$, flow ID 805-$j$, and input line number 806-$j$. Although not shown in FIG. 8, a MASK can be set for each bit. When every bit of the input line number 806-$j$ is masked, the SIP 801-$j$, the DIP 802-$j$, the SPORT 803-$j$, the DPORT 804-$j$, and the flow ID 805-$j$ are assumed as flow conditions.

The manager of the router 100 specifies each flow entry 810-$j$ of the CAM 702 at the management terminal 170. When the management terminal 170 sends a write command to be issued to the CAM 702, the address of the CAM 702, and information (including the MASK) to be written in the CAM 702 to the router 100, the CAM controlling means 701 writes the information in the address of the CAM 702.

Receiving the flow detection key information 14, the CAM 702 begins retrieving and comparing sequentially from the first flow entry 810-1, through the flow entry 810-$j$ in which the CAM address increases, and sends the CAM address (=$j$) of the first matching flow entry 810-$j$ to the address translating means 703 as matching address information 15. The address translating means 703 assigns a flow ID that is an identifier of a flow or a flow bundle to the matching address information 15 and sends the flow ID to the flow ID information distributing means 630 as flow ID information 12. When the same value is taken as a flow ID for different matching address information 15, a plurality of flows can be bundled into one.

Figure 9:
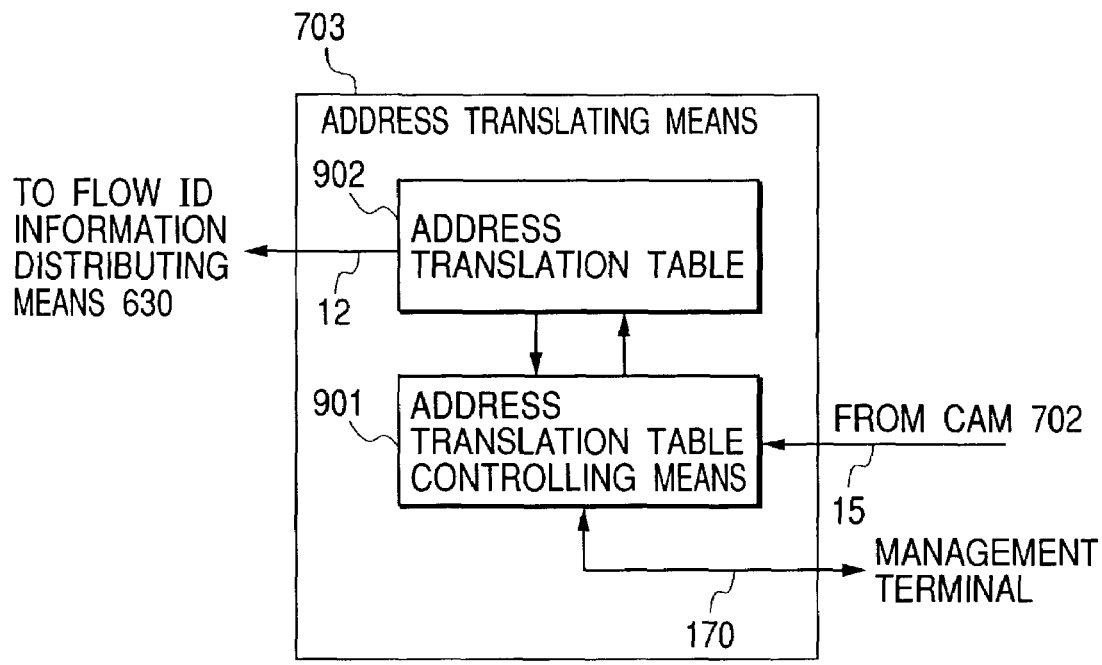
FIG. 9 is a block diagram of an address translating means of the present invention.
Figure 10:
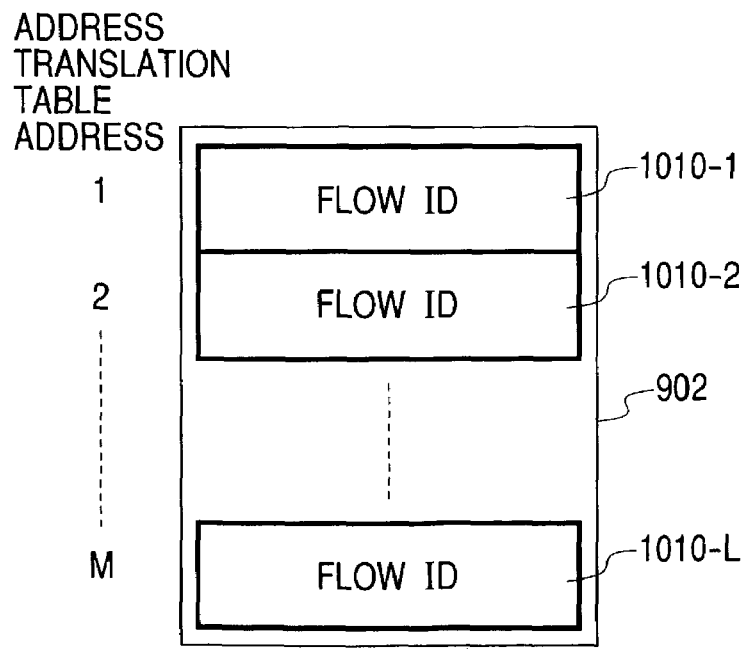
FIG. 10 is a format of an address translation table of the present invention.

FIG. 9 shows an example of the address translating means 703. The address translation table controlling means 901, when receiving matching address information 15, sends this value as a read address for reading data from the address translation table 902. FIG. 10 shows a format of the address translation table 902. The address translation table 902 outputs a flow ID 1010-$j$ ($j$=1 to M) corresponding to the read address as flow ID information 12. Because the same value is written in the flow ID field 1010-$j$ of each flow in the same flow bundle, a plurality of flows can be combined into a flow bundle.

The manager of the router 100 specifies a flow ID 1010-$j$ of the address translation table 902 at the management terminal 170 just like for the CAM 702. When the management terminal 170 sends a write command to be issued to the address translation table 902, an address of the address translation table 902, and information to be written in the address translation table 902 to the router 100, the address translation table controlling means 901 writes the write information in the address of the address translation table 902.

Figure 21:
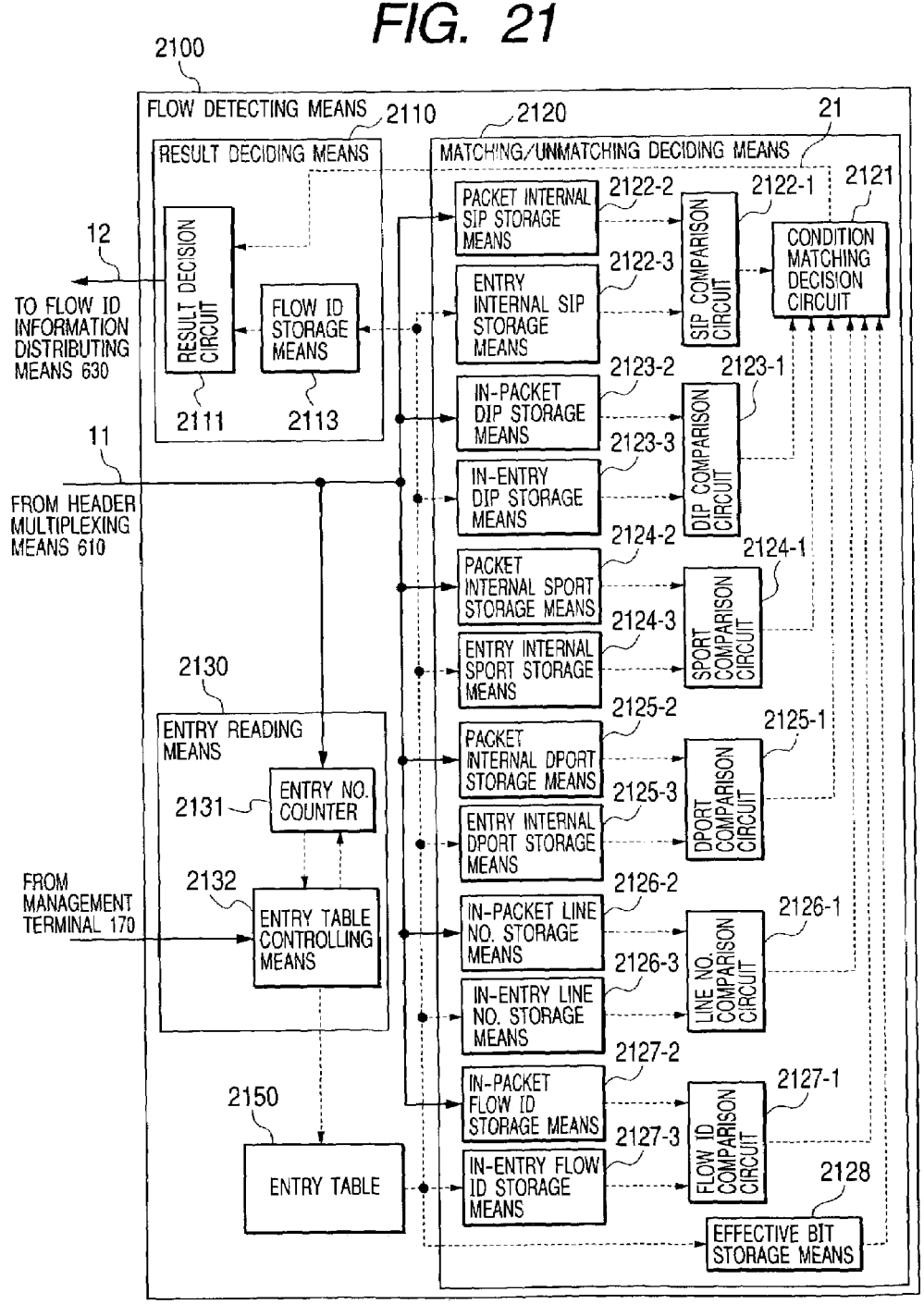
FIG. 21 is a block diagram of another embodiment of the flow detecting means of the present invention.
Figure 22:
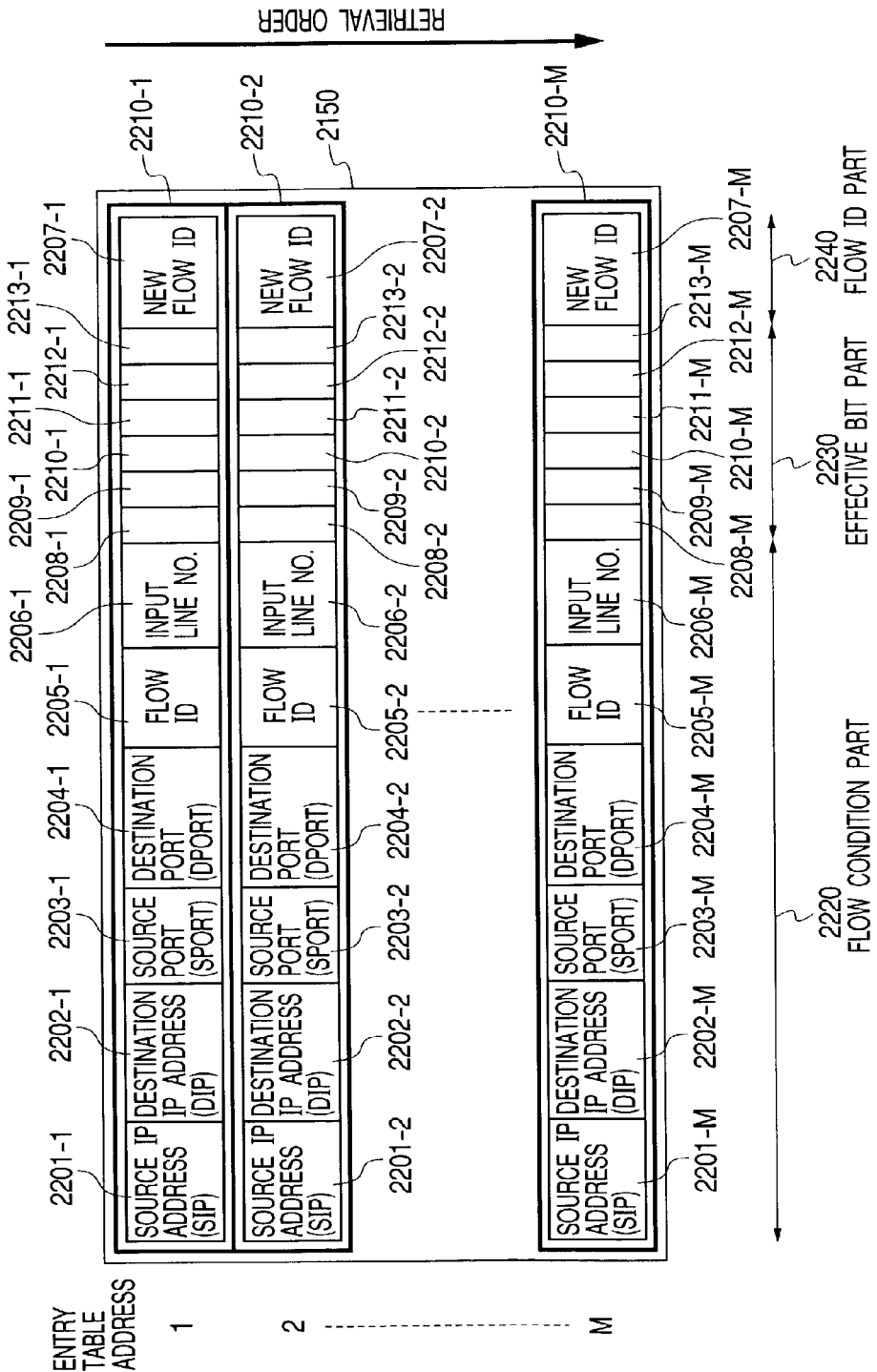
FIG. 22 is a format of an entry table of the present invention.

FIG. 21 shows a flow detecting means 2100, which is another embodiment of the flow detecting means 600. FIG. 22 shows a format of an entry table 2150 located in the flow detecting means 2100. The entry table 2150 shown in FIG. 22 consists of M entries 2210-$j$ ($j$=1 to M). An entry 2210-$j$ consists of a flow condition part 2220-*j* for describing a flow condition, an effective bit part 2230-*j*, and a flow ID 2240-*j*. The flow condition part 2220-*j* consists of fields of SIP 2201-*j*, DIP 2202-*j*, SPORT 2203-*j*, DPORT 2204-*j*, flow ID 2205-*j*, and input line number 2206-*j*. The effective bit part 2230-*j* has fields of SIP_Enable 2208-*j*, DIP_Enable 2209-*j*, SPORT_Enable 2210-*j*, DPORT_Enable 2211-*j*, flow ID_Enable 2212-*j*, and input line number_Enable 2213-*j*. Each of those fields contains 1-bit information. When "1" is written, it is used as a flow condition, and when "0" is written, it is not used as a flow condition. The flow ID part 2240-*j* includes a new flow ID 2207-*j* field to be assigned to a packet matching with the effective flow condition.

Figure 23:
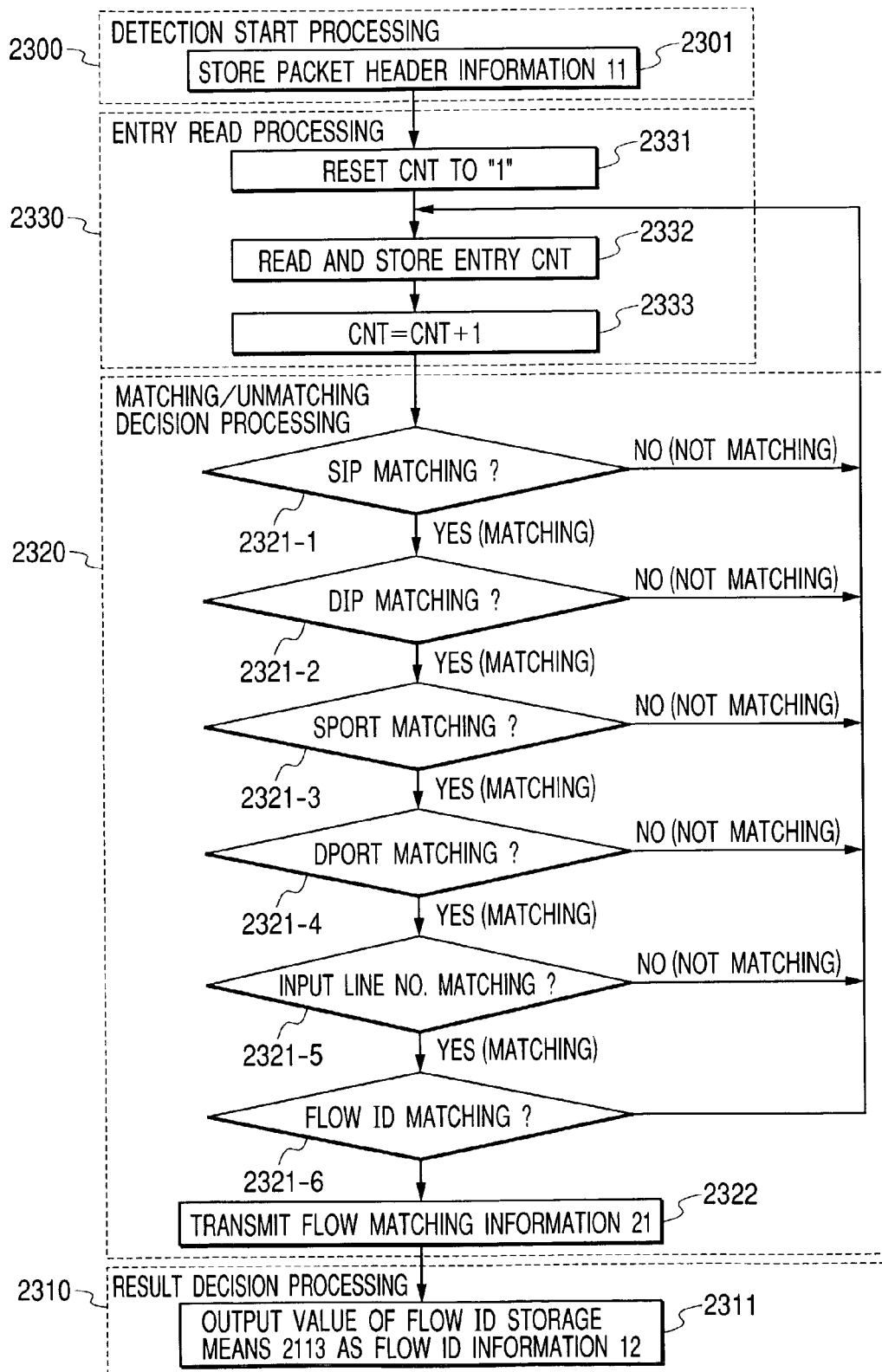
FIG. 23 is a flowchart of the processings performed by the flow detecting means.

FIG. 23 shows a flowchart of the processings performed by the flow detecting means 2100. The flow detecting means 2100 performs the detection start processing 2300, the entry read processing 2330, the condition matching decision procession, and the result decision procession 2310.

Each of the above processings of the flow detecting means 2100 is described sequentially. Receiving the packet header information 11, the flow detecting means 2100 stores information items read from the fields of the packet header information 11, such as input line number 332, the SIP 311, the DIP 312, the SPORT 313, the DPORT 314, and the flow ID 334 in the packet line number storage means 2126-2, the packet DIP storage means 2123-2, the packet SPORT storage means 2127-2, the packet DPORT storage means 2125-2, and the packet flow ID storage means 2127-2 located in the condition matching decision means 2120 respectively, then stores information items read from the fields of SIP_Enable 2208-*j*, DIP_Enable 2209-*j*, SPORT_Enable 2210-*j*, DPORT_Enable 2211-*j*, flow ID_Enable 2212-*j*, and input line number_Enable 2213-*j* in the effective bit storing means 2128 respectively (step 2301).

During the entry read processing 2330, the entry reading means 2130 resets the CNT (the value recorded in the entry number counter 2131) to "1" so as to read the start entry 2210-1 from the entry table 2150. Then, the entry table controlling means 2132 reads the entry number counter value CNT of the entry 2210-1 as a read address of the entry table 2150, then stores the SIP 2201-1 in the entry SIP storage means 2122-3, the DIP 2202-1 in the entry DIP storage means 2123-3, both of SPORT 2203-1 and DPORT 2204-1 in the entry SPORT storage means 2124-3 and in the entry SPORT storage means 2125-3, the input line number 2206-1 in the entry line number storage means 2126-3, the flow ID 2205-1 in the entry flow ID storage means 2127-3, and the new flow ID 2207-1 in the entry flow ID storage means 2133 in the result deciding means 2110 located in the condition matching decision means 2120 respectively (step 2332). In addition, the entry reading means 2130 counts up the value CNT of the entry number counter 2331 so as to read the entry 2210-2 at the time of the next entry read processing 2330 (step 2333). By repeating the above entry read processing 2330, the entry reading means 2130 reads the entries 2210-*j* from the addresses in the entry table in an ascending order.

During the condition matching decision procession 2320, the condition matching decision means 2120 compares each flow condition with the packet header information 11. The flow conditions are stored in the entry SIP storage means 2122-3, the entry DIP storage means 2123-3, the entry SPORT storage means 2124-3, the entry DPORT storage means 2125-3, the entry line number storage means 2126-3, and the entry flow ID storage means 2127-3 respectively.

The SIP comparing circuit 2122-1 assigns "matching" when the SIP_Enable 2208-*j* stored in the effective bit storage means 2128 is "0". If the SIP_Enable 2208-*j* is "1", the SIP comparing circuit 2122-1 compares the SIP 311 (stored in the packet SIP storage means 2122-2) with the SIP 2201-*j* (stored in the entry SIP storage means 2122-3) to decide whether they match (step 2321-1). Each of the DIP comparing circuit 2123-1, the SPORT comparing circuit 2124-1, the DPORT comparing circuit 2125-1, the line number comparing circuit 2126-1, and the flow ID comparing circuit 2127-1 perform processings regarding the respective information items of DIP, SPORT, DPORT, input line number, and flow ID likewise (steps 2321-2 to 2321-6). The condition matching decision circuit 2121, when deciding as "matching in each of steps 2321-1 to 2321-6, sends the flow condition matching information 21 to the result deciding circuit 2111 located in the result deciding means 2110 (step 2322). The condition matching decision circuit 2121, when deciding "unmatching" in any of those steps, goes back to step 2332.

During the result decision procession 2310, the result deciding circuit 2111, on receiving flow condition matching information 21, sends a new flow ID 2207-*j* read from the flow ID storage means 2113 to the flow ID information distributing means 630 as the flow ID information 12 (step 2311). The flow detecting means 2100 of the present invention uses the same value for the new flow ID 2207-*j* stored in a plurality of entries 2210-*j* thereby bundling a plurality of flows into one.

Similarly to the case of the CAM 702, the manager of the router 100 specifies an entry 2210-*j* of the entry table 2150 at the management terminal 170. When the management terminal 170 sends a write command for writing data in the entry table 2150, an address of the entry table 2150, and information to be written in the entry table 2150 to the router 100, the entry table controlling means 2132 writes the write information in the address in the entry table 2150.

FIG. 35 shows an input screen of the management terminal 170 on which flow conditions and flow IDs corresponding to the flow conditions are to be inputted. Each line on the screen describes flow conditions and a command Flow used to input a flow ID of a packet flow matching with the flow conditions. The command Flow 1 on the first line describes "any (not used as a flow condition)" in each of the fields SIP, DIP, SPORT, DPORT, and flow ID. This indicates that a new flow ID (Newflow ID) 4 is assigned to each packet for which an input line number (inport) 3 is written. "1" is written in this command Flow 1 which indicates that the command number as "1". Similarly, the command on the second line indicates that a new flow ID (Newflow ID) 4 is assigned to each packet for which an input line number (inport) 4 is written.

Figure 37:
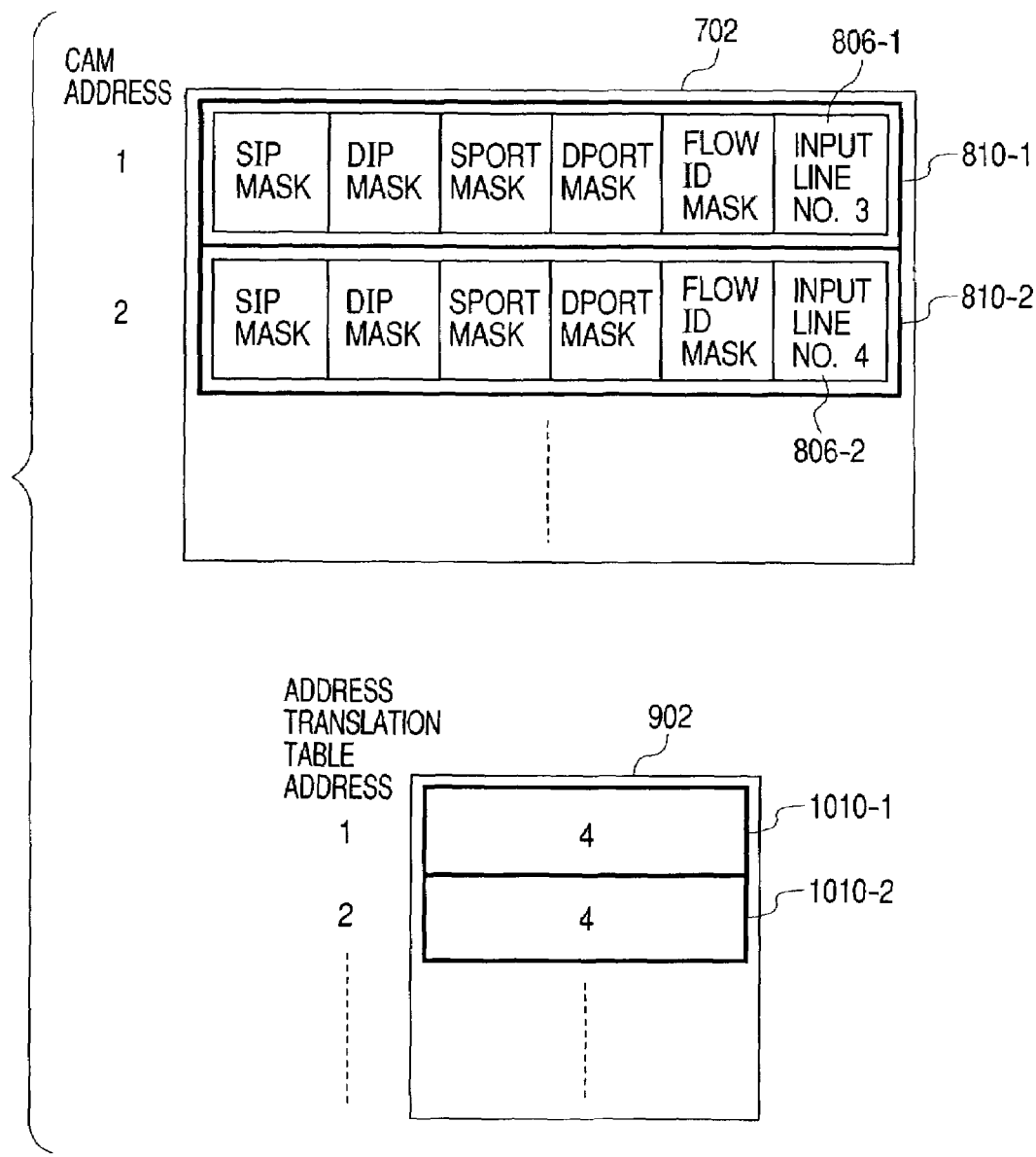
FIG. 37 shows inputted items in both the CAM and the address translation table in response to a command input shown in FIG. 35 from the management terminal.

When those commands are inputted to the management terminal 170, the values shown in FIG. 37 are written in the CAM 702 of the flow detecting means 600 and the address translation table 902. A flow entry 810-*j* corresponding to a command whose command number is small is set in a small number CAM address of the CAM 702. And, only input line numbers 806-1 and 806-2 among the flow conditions in the flow entry 810-*j* are specified and other items are all MASKed.

As for the flow detecting means 2100, the values shown in FIG. 38 are written in the entries 2210-*j* in the entry table 2150. And, an entry 2210-*j* corresponding to a command whose number is small is set in a small number address in the flow entry table 2150. Only the input line numbers 2206-1 and 2206-2 in the flow condition part 2220 are specified, and "don't care" (any value may be set) is set for all other items. In the effective bit part 2230, "1" is written only for the input line number_Enable 2213-1 and 2213-2 as flow conditions such that only the two input lines are used.

Figure 11:
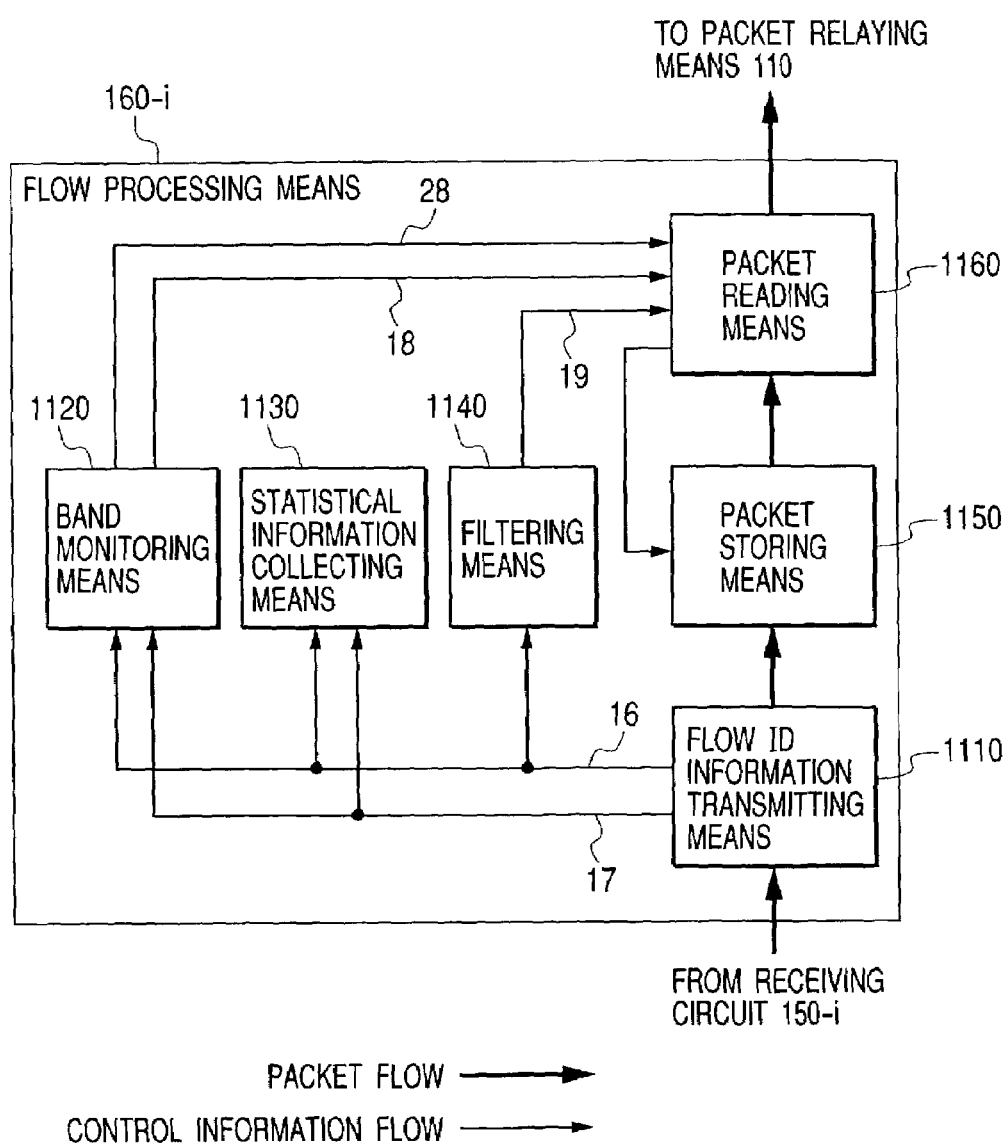
FIG. 11 is a block diagram of a flow processing means of the present invention.

Next, the details of the operation of the flow processing means **160-*i* is described. FIG. 11 shows a block diagram of the flow processing means 160-*i*. When the flow processing means 160-*i* receives a packet from the receiving circuit 150-*i*, the flow ID information sending means 1110 extracts the flow ID 334 from the packet, then sends this information to the object device as flow ID information 16. The sending means 1110 then extracts the packet length 331 and sends the information to the object device as packet length information 17 and sends the packet itself to the packet storing means 1150. The packet storing means 1150** stores this packet temporarily.

Figure 12:
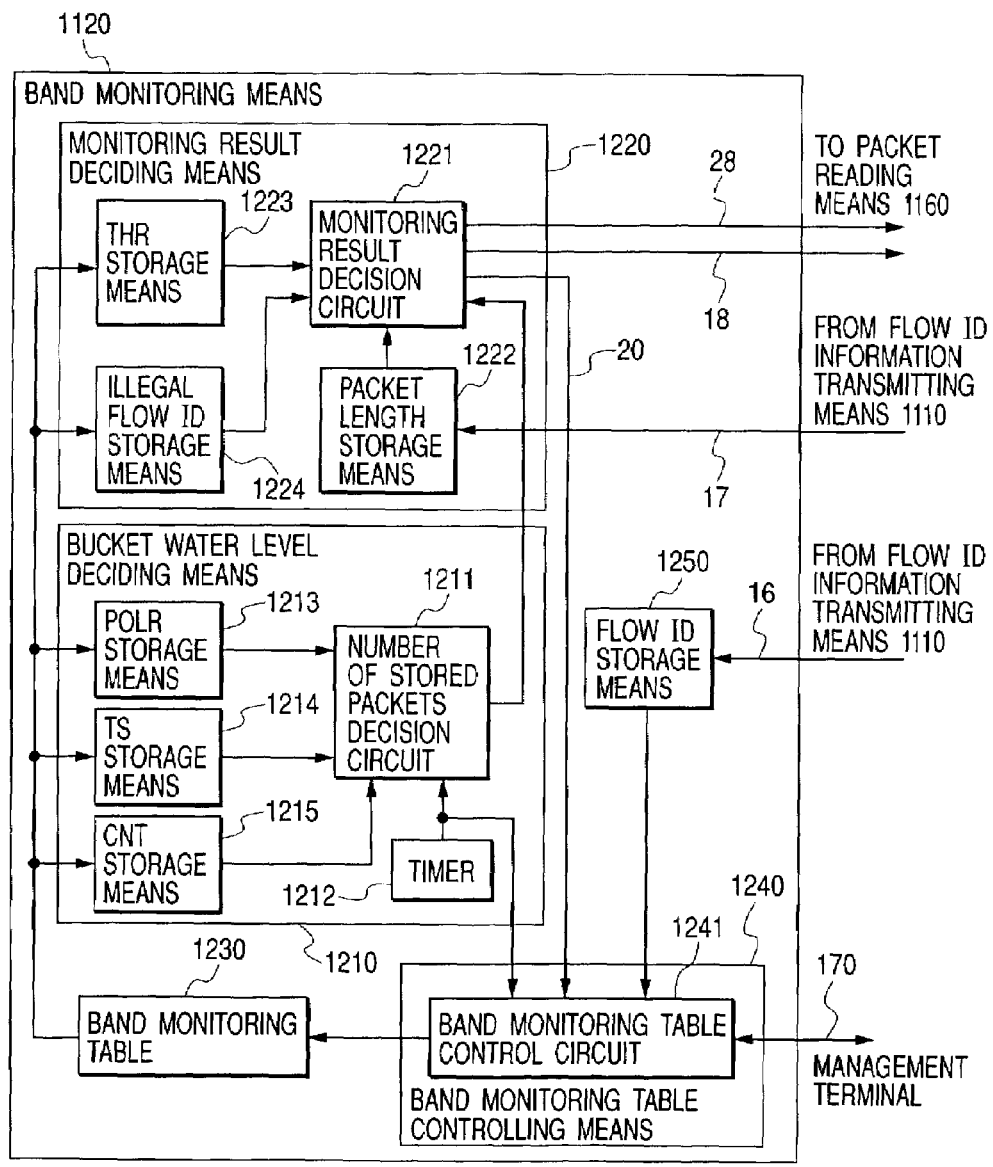
FIG. 12 is a block diagram of a bandwidth monitoring means of the present invention.

At first, the bandwidth monitoring means 1120 used for bandwidth monitoring is described. FIG. 12 shows a block diagram of the bandwidth monitoring means 1120. In this example, an algorithm expanded from the continuous state Leaky Bucket Algorithm (hereinafter the "Leaky Bucket Algorithm") for monitoring fixed length packets/cells is employed as the bandwidth monitoring algorithm for monitoring the bandwidth of variable length packets. The Leaky Bucket Algorithm is described in, for example, Chapter 4.4.2 of "The ATM Forum Specification version 4.1". The Leaky Bucket Algorithm is a model of leaky buckets with a certain depth. While water is in the bucket, the water leaks in the monitoring bandwidth and water for a cell is poured into the bucket upon an arrival of a cell. The bucket has a certain depth so as to permit arrival of a cell burst. Before the bucket overflows, input cells are decided as "legal", and when the bucket overflows, input cells are decided as "illegal". In this specification, the amount of water poured in varies upon an arrival of a packet such that bandwidth monitoring is enabled for the variable length packets.

Figure 13:
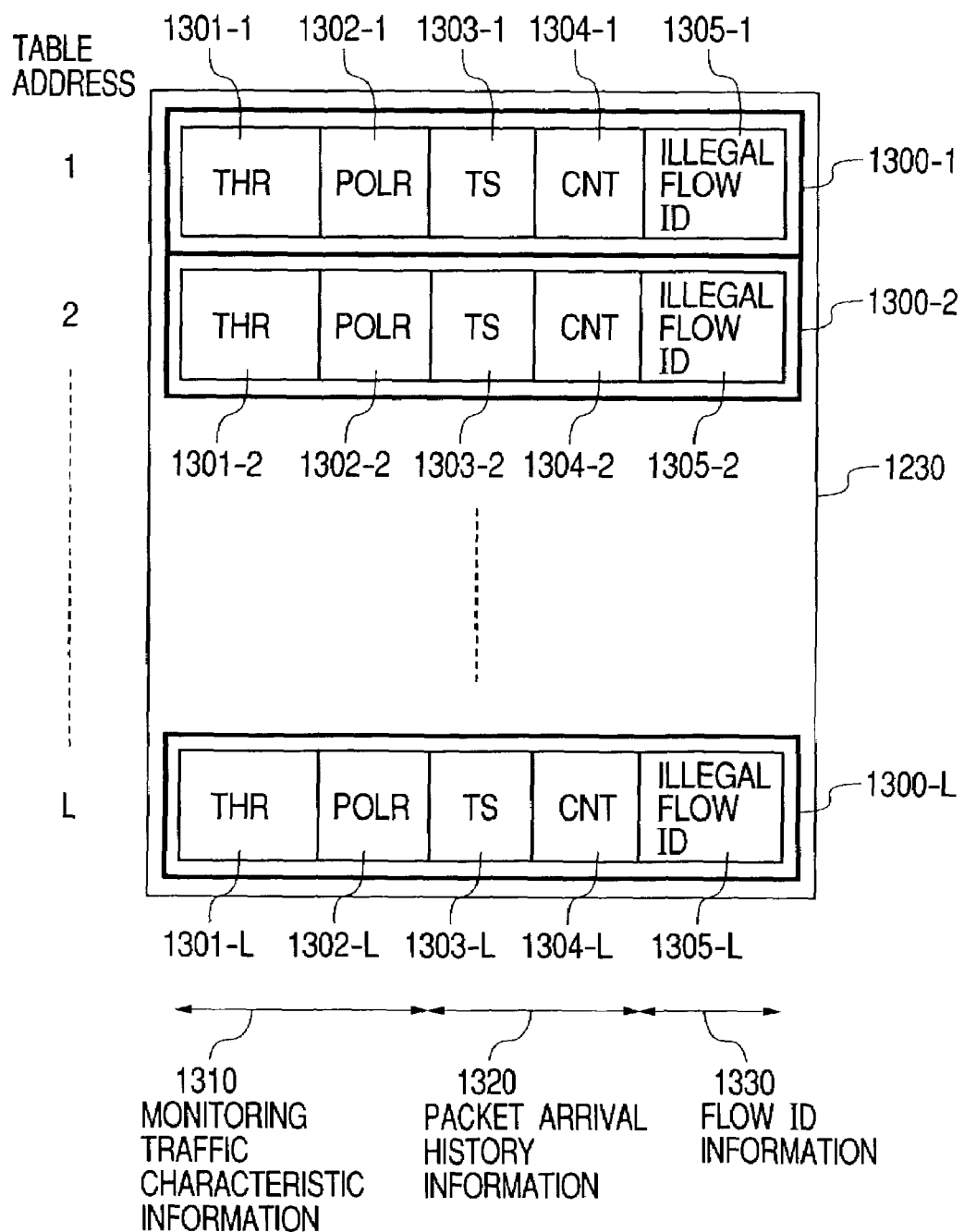
FIG. 13 is a format of a bandwidth monitoring table of the present invention.

The bandwidth monitoring means 1120 is composed of a stored bucket water level deciding means 1210, a monitoring result deciding means 1220, a bandwidth monitoring table 1230, and a bandwidth monitoring table controlling means 1240. FIG. 13 shows a format of the bandwidth monitoring table 1230. The bandwidth monitoring table 1230 has L bandwidth monitoring control entries **1300-*k*** (*k*=1 to L). The bandwidth monitoring means 1120 monitors the bandwidth of each flow ID according to the control of a bandwidth monitoring control entry **1300-*k***.

The bandwidth monitoring control entry **1300-*k* is composed of monitoring traffic characteristic information 1310-*k* that describes characteristics of a traffic to monitor, packet arrival history information 1320-*k* that describes packet arrival history information, and flow ID information 1330-*k*. The monitoring traffic characteristic information 1310-*k* is composed of a bucket depth THR 1301-*k* (bytes)(threshold) representing a burst tolerance and a leaking speed POLR 1302-*k* (bytes/sec) (policing rate) for monitoring a bandwidth. The packet arrival time history information 1320-*k* is composed of an arrival time TS 1303-*k* (sec)(time stamp) of the previous packet in the same flow or flow bundle and a stored bucket water level CNT 1304-*k* (bytes)(count) right after the bandwidth of the same flow or flow bundle of packets is monitored. The flow ID information is composed of a flow ID: illegal flow ID 1305-*k*** to be reset for a packet decided as "illegal".

Figure 15:
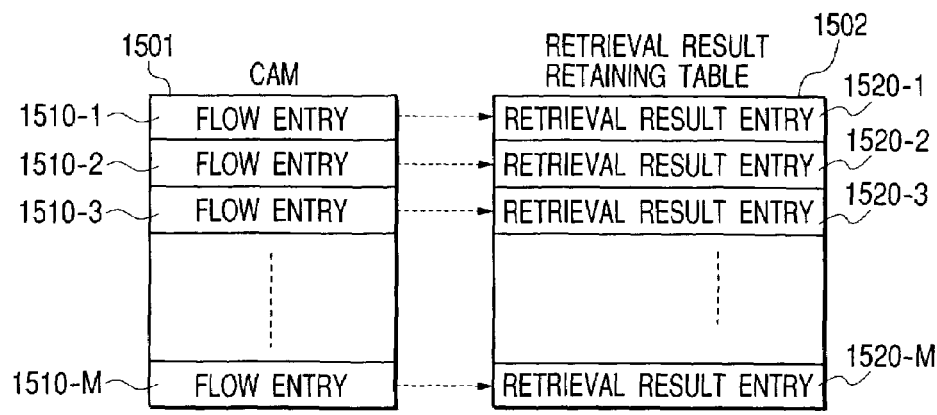
FIG. 15 is a configuration of the conventional technique 2.

In order to monitor the bandwidth of a plurality of flows at a time, it is necessary to detect a plurality of flows. In the case of the technique described in the Document 2, a plurality of flow entries **1510-*j* are set, and a plurality of bandwidth monitoring control entries would be referred to (see FIG. 15). However, to monitor the bandwidth of packets in the same flow bundle, the bandwidth monitoring function needs to refer to the same arrival history information 1320-*k* (TS 1303-*k* and CNT 1304-*k***). The bandwidth monitoring function according to the technique described in the Document 2 does not bundle packet flows into flow bundles therefore it does not monitor the bandwidth of a plurality of bundled packet flows collectively.

In this embodiment of the present invention, therefore, an expanded algorithm of the Leaky Bucket Algorithm is used as the bandwidth monitoring algorithm, although the same problem as the above described one also arises when the algorithm is required to hold the arrival history information of each packet.

Figure 14:
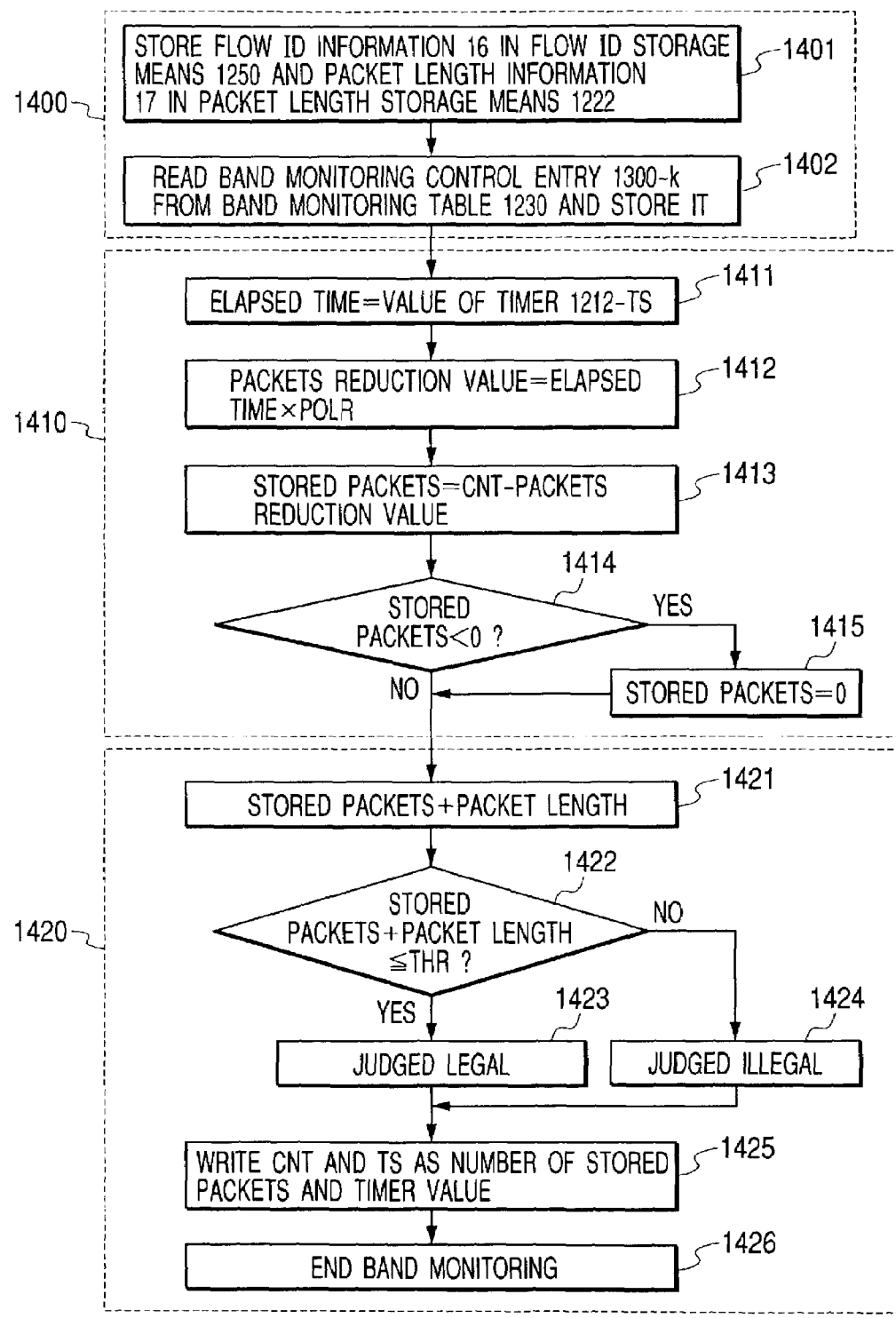
FIG. 14 is a flowchart of the processings performed by the bandwidth monitoring means of the present invention.

FIG. 14 shows a flowchart of the processings performed by the bandwidth monitoring means 1120. In particular, the three processings of the bandwidth monitoring means 1120 include the bandwidth monitoring start processing 1400, the stored bucket water level decision procession 1410, and the monitoring result decision procession 1420.

The bandwidth monitoring means 1120, when receiving the flow ID information 16 and the packet length information 17, stores the flow ID 334 obtained from the flow ID information 16 in the flow ID storage means 1250 and the packet length 331 obtained from the packet length information 17 in the packet length storage means 1222 respectively (step 1401).

In step 1402, the bandwidth monitoring table control circuit 1241 uses the flow ID 334 in the flow ID storage means 1250 as a read address to read the bandwidth monitoring control entry **1300-*k*, then stores the THR 1301-*k* and the illegal flow ID 1305-*k* in the THR storage means 1223 of the monitoring result deciding means 1220 and the illegal flow ID storage means 1224 respectively, and stores the POLR 1302-*k*, the TS 1303-*k*, and the CNT 1304-*k* in the POLR storage means 1213, the TS storage means 1214, and the CNT storage means 1215 of the stored bucket water level deciding means 1210** respectively.

During the stored bucket water level decision procession 1410, the stored bucket water level deciding means 1210 calculates a stored bucket water level right before an input of a packet. At first, the stored bucket water level deciding circuit 1211 calculates a difference between the value of the current clock timer 1212 and the TS **1303-*k* (sec) that is the arrival time of the previous packet stored in the TS storage means 1214, thereby calculating the time lapse (sec) from the arrival of the previous packet (step 1411). Then, the stored bucket water level deciding means 1210 multiplies the time lapse (sec) by the POLR 1302-*k* stored in the POLR storage means 1213 to calculate the amount of the water leaked (a reduction of the water in the bucket) since the arrival of the previous packet. In addition, the stored bucket water level deciding means 1210 subtracts the reduction of the bucket water from the CNT 1304-*k* that is stored in the CNT storage means, and the means 1210 indicates a stored bucket water level right after the bandwidth of the previous packet is monitored so as to decide the stored bucket water level right before an input of another packet (step 1413). The bucket water level deciding means 1210 decides positive/negative of the water level of the water in the bucket (step 1414). When the decision result is negative, the water level in the bucket is reset to "0" (empty)(step 1415**).

During the monitoring result decision procession 1420, the monitoring result deciding circuit 1221 of the monitoring result deciding means 1220 decides whether or not an amount of water equivalent to the packet length of an inputted packet can be poured in the bucket as follows. First, the circuit 1221 adds the packet length 331 (byte) stored in the packet length storage means 1222 to the stored bucket water level (byte) calculated in the stored bucket water level decision procession 1410 (step 1421). Then, the circuit 1221 compares the depth of the bucket THR 1301-$k$ stored in the THR storage means 1223 with the added value (step 1422). When the result is bucket water level+ packet length> THR 1301-$k$ and the amount of the water equivalent to the packet length overflows from the bucket, the inputted packet is decided as an illegal one such that the monitoring result information 18 (that represents "illegal") and the illegal flow ID 1305-$k$ read from the illegal flow ID storage means 1224 are set to the packet reading means 1160 as illegal flow ID information 28. And, because an amount of water equivalent to the inputted packet is poured into the bucket, the circuit 1221 sends the value of "the bucket water level" as is to the bandwidth monitoring table control circuit 1241 as stored bucket water level information 20 that indicates the level of stored water in the bucket right after the bandwidth is monitored (step 1424). On the other hand, when the result is the bucket water level+packet length≦ THR 1301-$k$, the input packet is decided as "legal" such that the monitoring result information 18 representing "legal" is sent to the packet reading means 1160. At this time, the illegal flow ID information 28 is meaningless. And, because an amount of water equivalent to an inputted packet is poured into the bucket, the circuit 1221 sends the value of "stored bucket water level+ packet length" to the bandwidth monitoring control circuit 1241 as the stored bucket water level information 20 (step 1423).

The bandwidth monitoring table control circuit 1241 writes the stored bucket water level information 20 and the value of the timer 1212 in the CNT 1304-$k$ and in the TS 1303-$k$ as the water level in the bucket and the packet arrival time respectively right after the bandwidth monitoring (step 1425).

If the bandwidth monitoring means 1120 of the present invention, when deciding a packet as "illegal", updates the packet flow ID with a flow ID of a lower transfer priority level. The flow processing means 190-$i$ (to be described later) transfers the packet flow of the priority level according to this flow ID to assure the communication quality of the packets decided as "legal".

Figure 16:
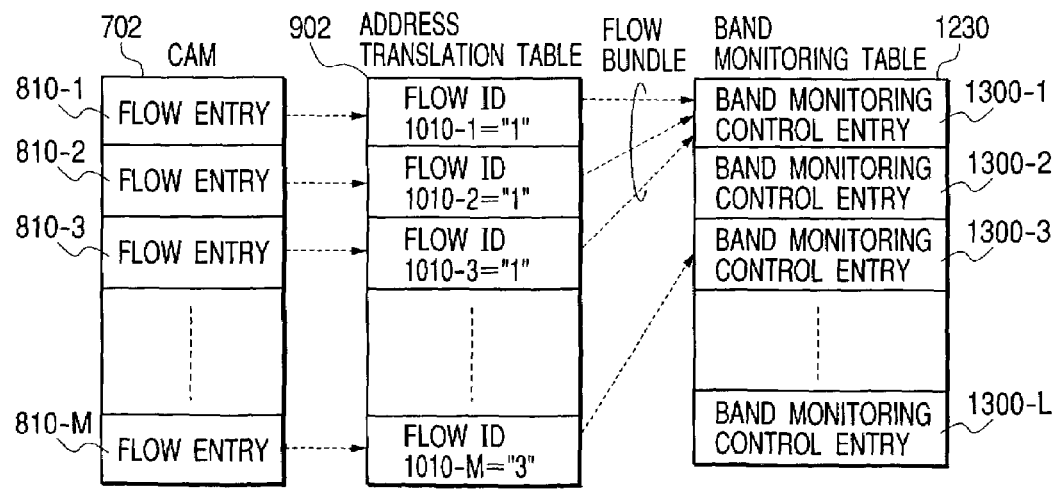
FIG. 16 is a chart depicting a relationship among a flow entry of a CAM, a flow bundle number of the address translation table, and a bandwidth monitoring control entry of the bandwidth monitoring table.

FIG. 16 depicts a relationship among the flow entry 810-$j$ of the CAM 702, the flow ID 1010-$j$ of the address translation table 902, and the bandwidth monitoring control entry 1300-$k$ of the bandwidth monitoring table 1230. The flow IDs 1010-1, 1010-2, and 1010-3 are used to bundle into one the three flows detected according to the flow entries 810-1, 810-2, and 810-3. The conventional technique shown in FIG. 15 does not use any address translation table 902, so it cannot monitor the bandwidth of a flow bundle consisting of a plurality of flows.

Next, the router 100 of the present invention used as the edge router A202 shown in FIG. 2 is described. The edge router A202 monitors bandwidths of the packets transferred from both sites A210 and B220 at 10M bits/sec respectively. At this time, the edge router A202 specifies the flow entries 810-1 and 810-2 in which the identifiers "3" and "4" of the lines 206 and 207 shown in FIG. 2 are described in the input line number field 806-$j$ respectively so as to identify the packet flow 1 inputted from the line 206 and the packet flow 2 inputted from the line 207 respectively. If the same flow ID value is written for the flow IDs 1010-1 and 1010-2, the flows 1 and 2 can be bundled into one. The edge router A202 thus specifies 1.25M (bytes/sec) (=10M bits/sec) for the POLR 1302-$k$ of the bandwidth monitoring control entry 1300-$k$ corresponding to this transfer capacity value.

Figure 27:
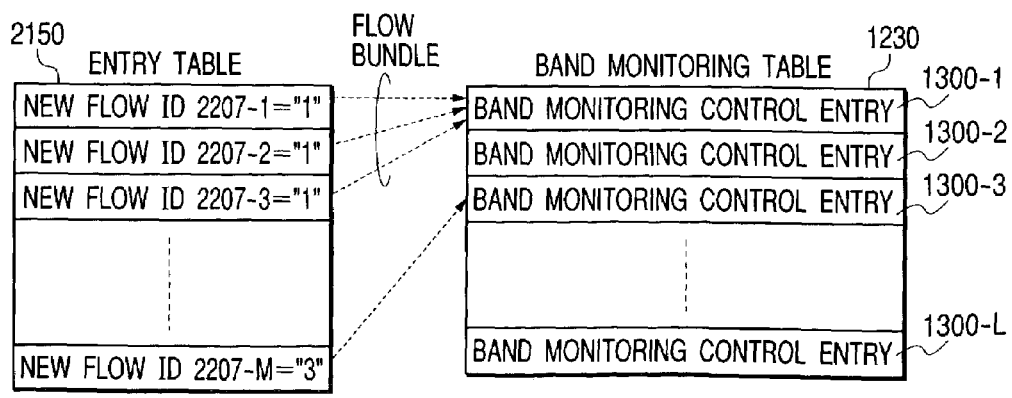
FIG. 27 is a chart depicting a relationship between a flow entry of the entry table and a bandwidth monitoring control entry of the bandwidth monitoring table.

FIG. 27 depicts a relationship between the new flow ID 2207-$j$ and the bandwidth monitoring control entry 1300-$k$ written in the entry table 2150 of the flow detecting means 2100. The new flow ID 2207-1, the new flow ID 2207-2, and the new flow ID 2207-3 take the same value to bundle the three flows into one. By specifying the same value for the new flow IDs of a plurality of flows, bandwidth monitoring is done for a plurality of flows bundled into one.

When the flow detecting means 600/2100 bundles a plurality of flows, the number of flow entries 810-$j$ and the number of entries 2210-$j$ to be specified becomes large such that the entries in the CAM 702 and the entry table 2150 run short of entries sometimes. To avoid such a problem, the flow detecting means 600 (as an example) in which only the packets whose SPORT numbers are "8", "11", "20", and "25" among those sent out from the sites A210 and B220 are transferred. At this time, it is required to specify the number of 4 (the number of SPORT conditions)×2(the number of sites) flow entries 810-$j$ shown in FIG. 31 in the CAM 702. Similarly, it is required to specify 8 entries 2210-$j$ in the entry table 2150. The number of entries for describing flow conditions is resulting from a multiplication of the number of sites by the number of SPORT conditions such that the number of entries in the CAM 702 and in the entry table 2150 run short sometimes.

Figure 32:
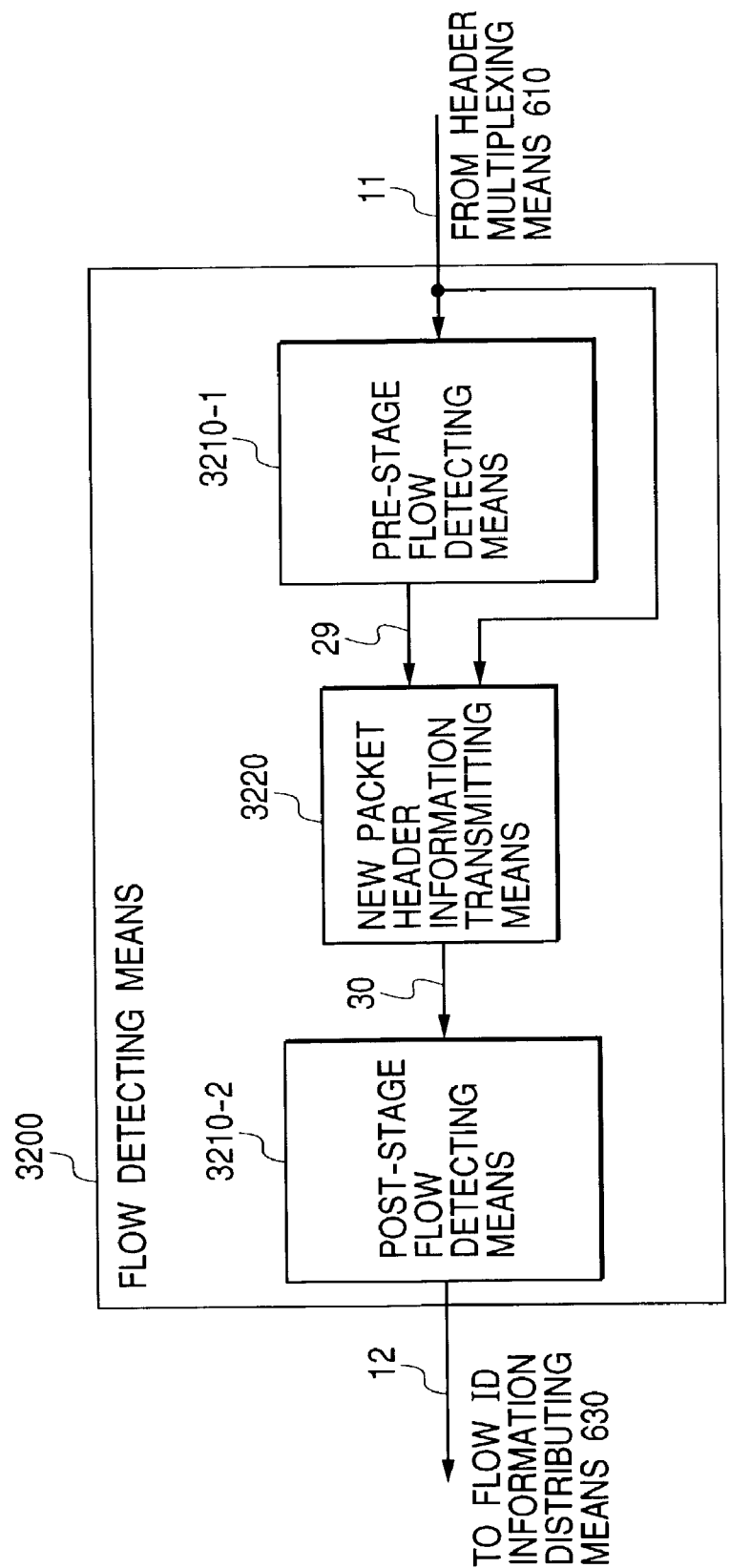
FIG. 32 is a block diagram of a flow detecting means of the present invention.

FIG. 32 shows the flow detecting means 3200 for easing such a shortage of entries. The flow detecting means 3200 is provided with a pre-stage flow detecting means 3210-1 and a post-stage flow detecting means 3210-2. The configuration and operation of the flow detecting means 3200 are the same as those of the flow detecting means 600/2100. The pre-stage flow detecting means 3210-1, when receiving the packet header information 11, detects a packet flow similarly to the flow detecting means 600/2100 to detect the flow ID and sends the flow ID information 29 to the object device. The new packet header information sending means 3220 rewrites the flow ID 334 written in the packet header information 11 as the value of the flow ID information 29, then sends the value to the object device as packet header information 30. The post-stage flow detecting means 3210-2 detects a packet flow from the packet header information 30, then sends the flow ID information 12 to the flow ID information distributing means 630.

Figure 33:
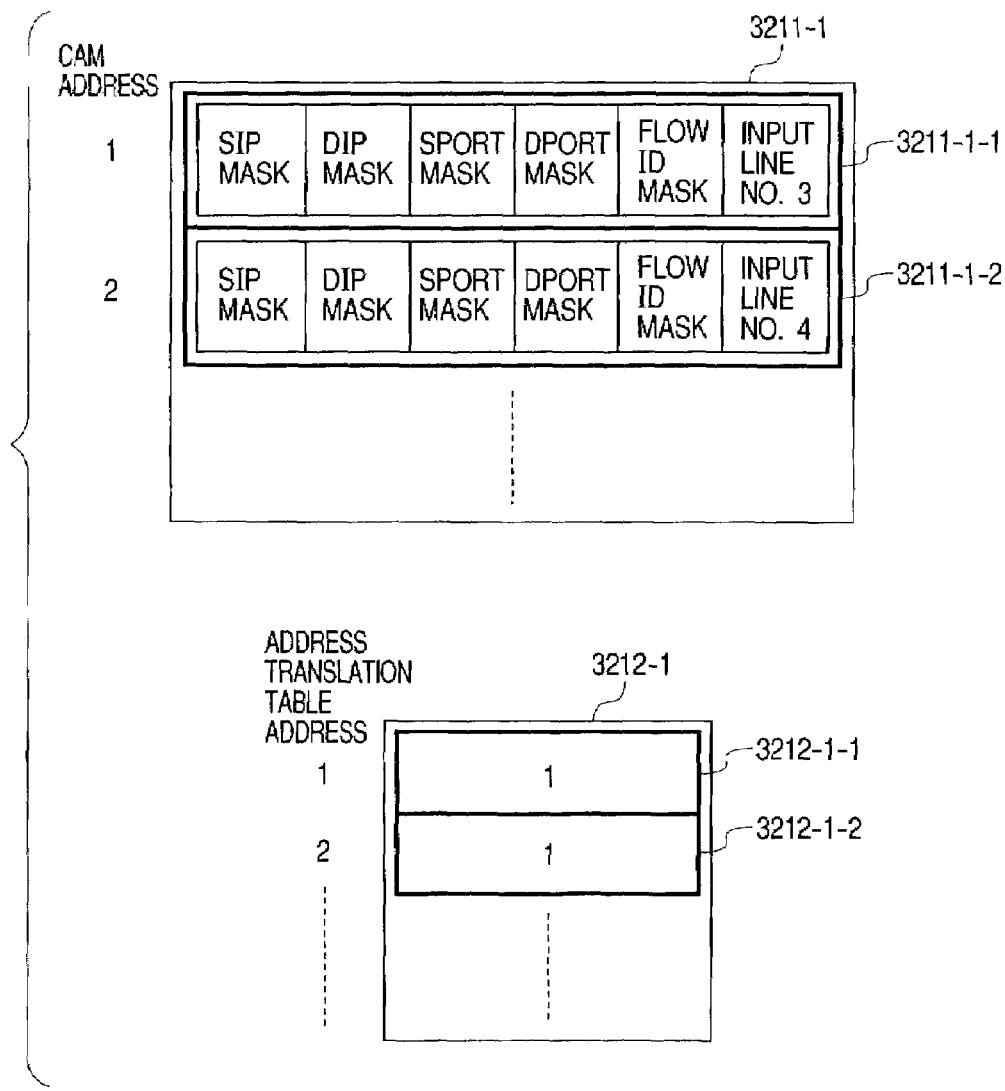
FIG. 33 shows inputted items of each flow entry in the CAM and values written in each registered flow ID in the address translation table in the pre-stage flow detecting means of FIG. 32.

FIGS. 33 and 34 show examples of table specification in the above case. FIG. 33 shows the CAM 3211-1 and the address translation table 3212-1 located in the pre-stage flow detecting means 3210-1 and FIG. 34 shows the CAM 3211-2 and the address translation table 3212-2 located in the post-stage flow detecting means 3210-2. The CAM 3211-1 located in the pre-stage flow detecting means 3210-1 detects packets received from the sites A210 and B220, and the flow IDs of those packet flows are bundled into "1" in the address translation table. The CAM 3211-2 located in the second flow detecting means 3210-2 assigns a flow ID=2 for the packets that satisfy the SPORT condition among those with a flow ID=1. The sum of the entries in both flow entries 3211-1-$j$ and 3211-2-$j$ in the flow detecting means 3200 becomes 4+2 (the number of sites). Such way, the number of entries becomes the sum of the sites and the SPORT (source port) conditions. In the case where a plurality of flows are bundled into one and a flow ID is decided for each bundle of flows under another condition (SPORT in the above example). As such, the flow detecting means 3200 of the present invention reduces the number of entries.

FIG. 39 shows an input screen of the management terminal 170 on which flow conditions and flow IDs corresponding to the flow conditions are to be inputted. The first and second lines are commands Preflow 1 and Preflow 2 used to specify flow conditions for the pre-stage flow detecting means 3210-1 and a packet flow ID matching with those flow conditions. The first line command Preflow 1 indicates that a new flow ID "1" is assigned to packets having "any (matching regardless of the specified value)" written in the fields of SIP, DIP, SPORT, DPORT, and flow ID and "3" written in the input line number (inport) field. Similarly, the second line command Preflow 2 indicates that a new flow ID "1" is assigned to packets having "4" written in the input line number (inport) field.

The third to sixth lines are commands Afterflow 1 to 4 used to set flow conditions for the pre-stage flow detecting means 3210-2 and a flow ID for packets matching with those flow conditions. The third line command Afterflow 1 indicates that a new flow ID "2" is assigned to packets in which "any (matching regardless of the set value)" is written for items of SIP, DIP, DPORT, and input line number (inport) and "1" is written for the flow ID, and "8" is written for SPORT. The commands on the fourth to sixth lines indicate that a new flow ID "2" is assigned to packets in which "1" is written for the flow ID and "11", "20", and "25" are written for the SPORT respectively.

When those commands are inputted to the management terminal 170, the values shown in FIGS. 33 and 34 are written in the CAM 702 and in the address translation table 902 of the flow detecting means 600.

Figure 17:
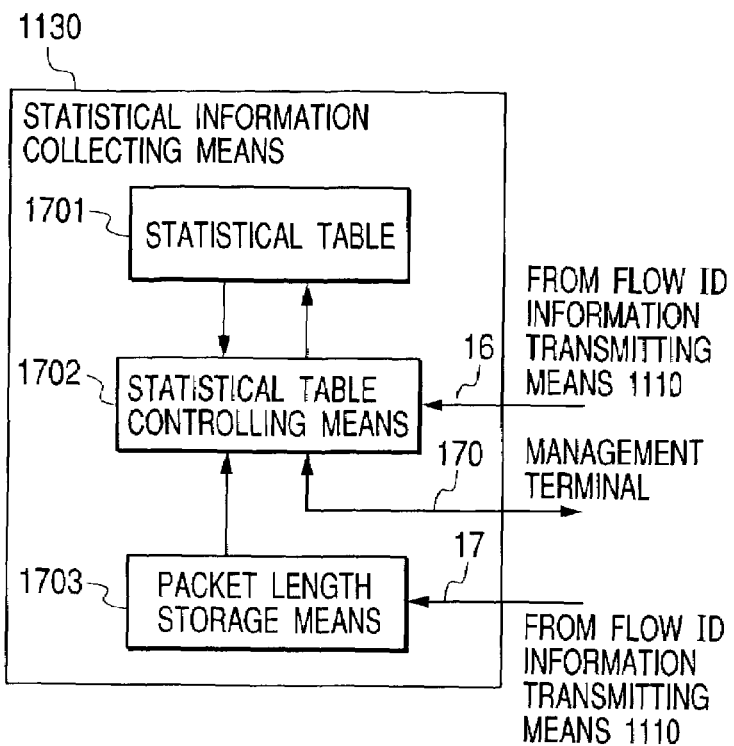
FIG. 17 is a block diagram of a statistical information collecting means of the present invention.
Figure 18:
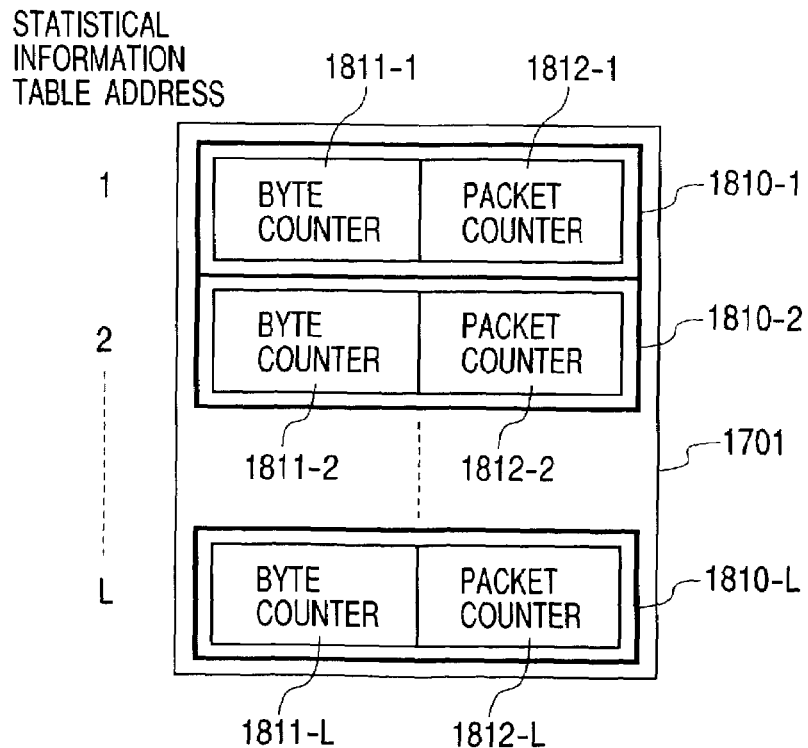
FIG. 18 is a format of a statistical information table of the present invention.

Next, how the statistical information collecting means 1130 collects statistical information is described with reference to FIGS. 17 and 18. FIG. 17 shows a block diagram of the statistical information collecting means 1130. The statistical information collecting means 1130 is composed of a statistical information table 1701 for storing statistical information, a statistical information table controlling means 1702, and a packet length storage means 1703. FIG. 18 shows a format of the statistical information table 1701. The table 1701 has fields of byte counter 1811-$k$ ($k$=1 to L) indicating a sum of the byte lengths of packets inputted to the flow processing means 160-$i$ and statistical entry 1810-$k$ for storing the value of the packet counter 1812-$k$ thereby indicating the number of packets with respect to each flow ID.

The statistical information collecting means 1130, when receiving the packet length information 17 from the flow ID information sending means 1110, stores the packet length 331 in the packet length storage means 1703. The statistical information table controlling means 1702 assumes the flow ID information 16 as a read address to read the statistical entry 1810-$k$ from the statistical information table 1701. The statistical information table controlling means 1702 adds the packet length read from the packet length storage means 1703 to the value of the byte counter 1811-$k$ and adds "1" to the value of the packet counter 1812-$k$, then writes back the result in the read address of the statistical information table 1701.

The management terminal 170 reads the statistical entry 1810-$k$ from the statistical information table 1701 via the statistical information table controlling means 1702. After sending a read command and a read address of the statistical information table 1701 to the statistical information table controlling means 1702, the statistical information table controlling means 1702 reads the statistical entry 1810-$k$ corresponding to the read address and sends the read entry to the management terminal 170.

The use of the flow detecting means 600/2100/3200 makes it possible to collect statistical information from a plurality of flows at the same time just like the above described bandwidth monitoring.

Figure 19:
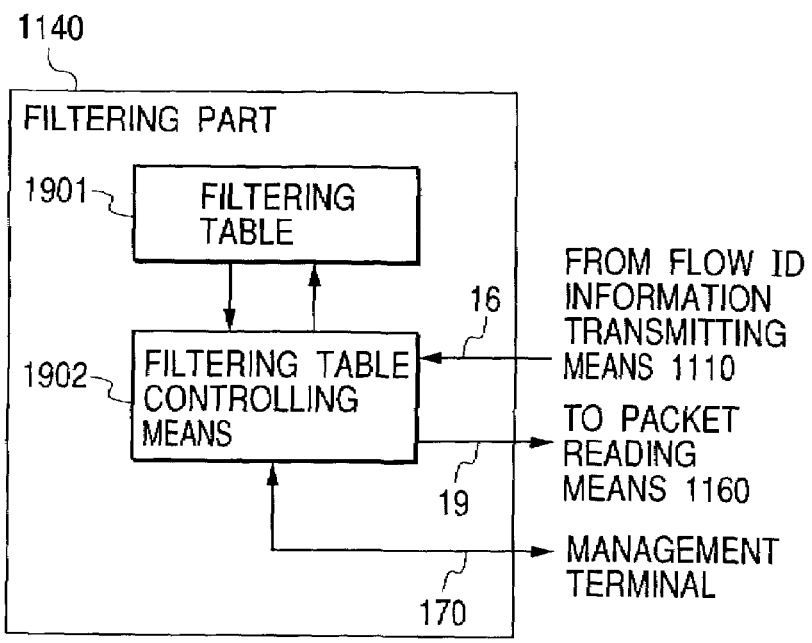
FIG. 19 is a block diagram of a filtering means of the present invention.
Figure 20:
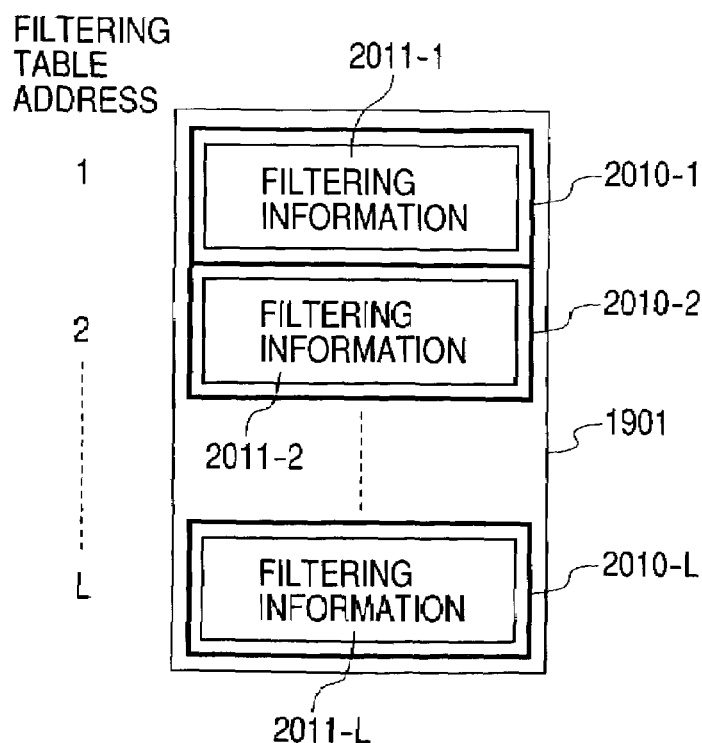
FIG. 20 is a format of a filtering table of the present invention.

Next, how the filtering means 1140 filters packets is described with reference to FIGS. 19 and 20. FIG. 19 shows a block diagram of the filtering means 1140. The filtering means 1140 is composed of a filtering table 1901 and a filtering table controlling means 1902. FIG. 20 shows a format of the filtering table 1901. The filtering table 1901 has filtering entries 2010-$k$, each consisting of filtering information 2011-$k$ ($k$=1 to L) for indicating pass/discard corresponding to each flow ID.

The filtering means 1140, when receiving the flow ID information 16 from the flow ID information sending means 1110, uses the information as a read address to read a filtering entry 2010-$k$ from the filtering table 1901. The filtering table controlling means 1902, when the filtering information 2011-$k$ indicates "pass", sends the "pass" filtering result information 19 to the packet reading means 1160. When the filtering result information 19 indicates "discard", the controlling means 1902 sends the "discard" filtering result information 19 to the packet reading means 1160.

The management terminal 170 then specifies the filtering entry 2010-$k$ of the filtering table 1901 via the controlling means 1902. When the management terminal 170 sends a write command, a write address of the filtering table 1901, and write data to the controlling means 1902, the controlling means 1902 writes the data in the filtering entry 2010-$k$ corresponding to the write address.

The packet reading means 1160 shown in FIG. 11, when the filtering result information 19 indicates "pass" and the monitoring result information 18 indicates "legal", reads packets from the packet storing means 1150 and sends the packets to the packet relaying means 110. When the monitoring result information 18 indicates "illegal", the packet reading means 1160 overwrites the illegal flow ID information 28 on the value of the flow ID 334, then reads packets and sends the packets to the packet relaying means 110. When the information 19 indicates "discard", the packet reading means 1160 suppresses sending of packets stored in the packet storage means 1150 to the packet relaying means 110. At this time, the packets stored in the packet storing means 1150 are overwritten by the packets arriving at the input line 101-$i$ next time. Because the packet reading means 1160 discards packets decided to be "discard" by the filtering means 1140, the filtering is effectively conducted by the flow processing means 160-$i$.

The sites A321 and C323 shown in FIG. 3 are networks belonging to the corporation A and the sites B322 and D324 are networks belonging to the corporation B. The sending/receiving packets between those corporations A and B is prevented as follows. The edge router A326 filters packet flows such that sending/receiving of packet flows is just enabled between the sites A321 and C323, as well as between the sites B322 and D324. Then, to pass packet flows from the corporation A, "pass" is set for the filtering result information when the SIP is set for the site A321 and the DIP is set for the site or the SIP is set for the site C323 and the DIP is set for the site A321. In addition, to pass the packets from the corporation B, "pass" is set for the filtering result information when the SIP is set for the site B322 and the DIP is set for the site D324 or the SIP is set for the D324 and the DIP is set for the site B322 is set respectively. In other cases, the necessary values may be set in the edge router A326 to enable "discard".

As described above, the number of flow detecting means does not increase even when the flow detecting means 600/2100/3200 located in the header processing means 120 assigns a unique flow ID in the router 100 for each flow or each flow bundle and the flow processing means 160-i performs bandwidth monitoring, statistical information collecting, and filtering according to the unique flow ID. Consequently, the router 100 of the present invention never increase the number of flow detecting means even when the number of flow processings increases.

Figure 25:
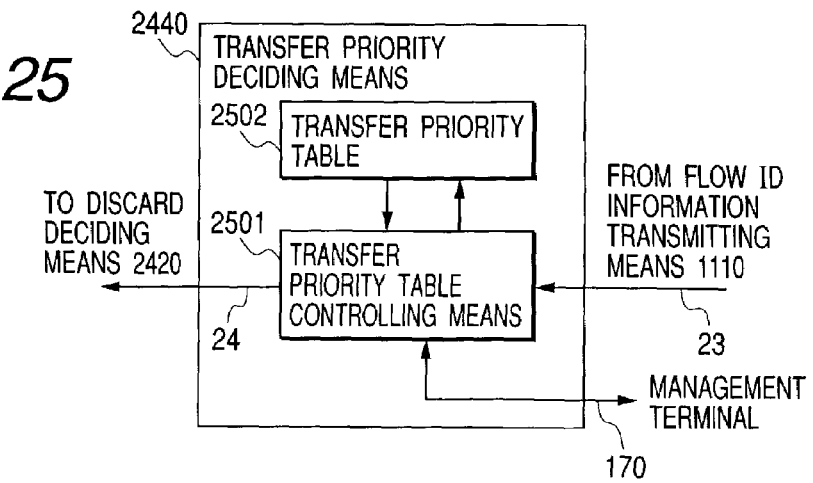
FIG. 25 is a block diagram of a priority-based transfer deciding means of the present invention.
Figure 26:
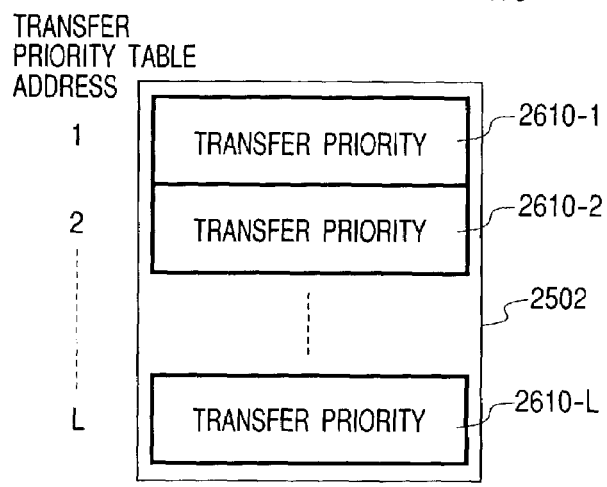
FIG. 26 is a format of a transfer priority table of the present invention.

Next, the operation of the flow processing means 190-i is described in detail with reference to FIGS. 24 through 26. The flow processing means 190-i performs priority-based transferring and statistical information collecting according to the flow ID 334. Regarding the priority-based transferring, non-priority packets is discarded to assure the communication quality of priority packets.

Figure 24:
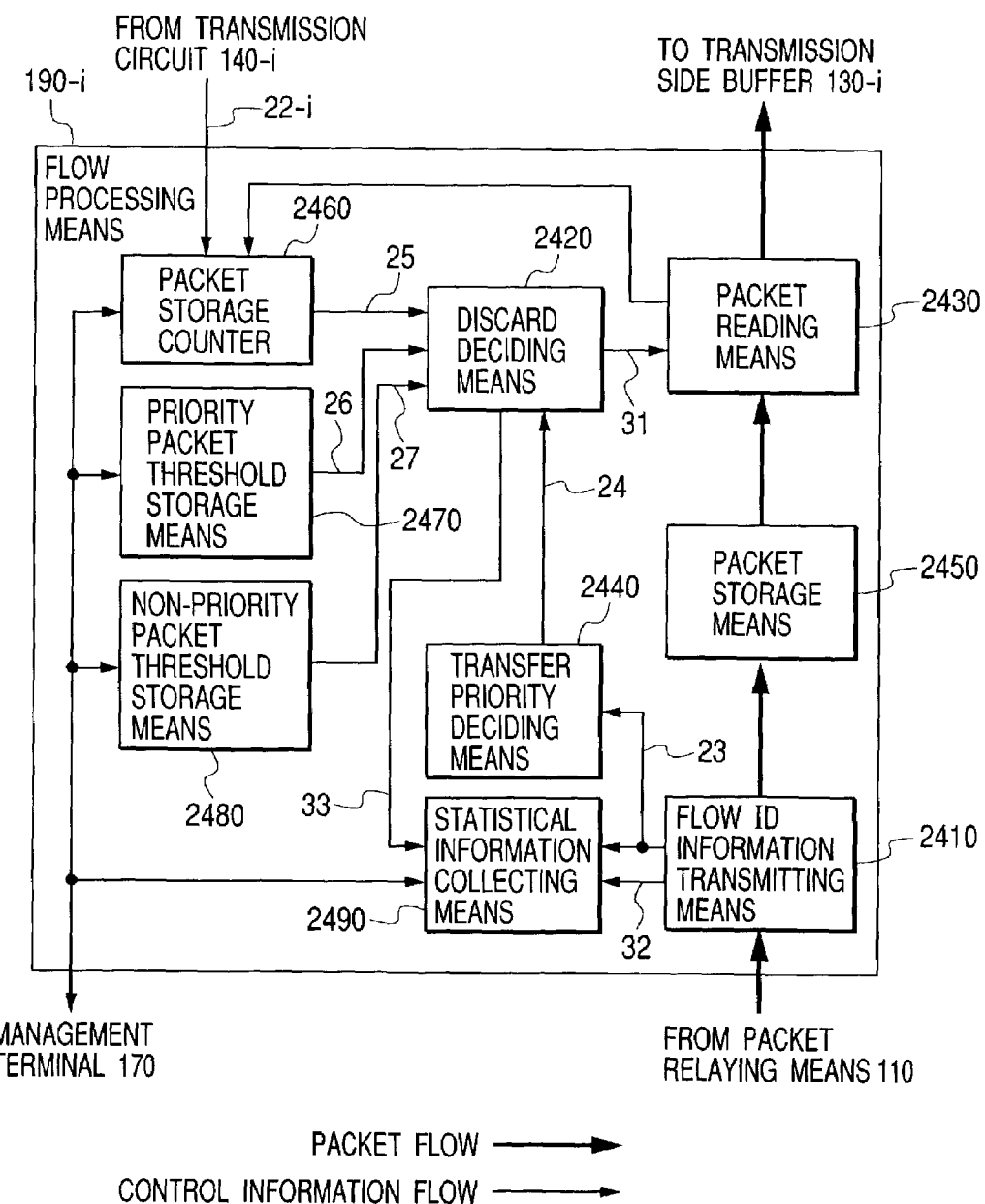
FIG. 24 is a block diagram of a flow processing means of the present invention.

FIG. 24 shows a block diagram of the flow processing means 190-i. The stored packet counter 2460 counts the number of packets stored in the sending side buffer 130-i. The priority packet threshold storage means 2470 and the non-priority packet threshold storage means 2480 store the number of priority packets and the number of non-priority packets to be stored in the sending side buffer 130-i, i.e., priority packet threshold value 26 and the non-priority packet threshold value 27 respectively. The priority packet threshold value 26 is no less than the non-priority packet threshold value 27. The stored packet counter 2460 is reset to "0" when the router 100 is powered and when the priority packet threshold value 26 and the non-priority packet threshold value 27 are specified from the management terminal 170. When the packet reading means 2430 sends a packet to the sending side buffer 130-i, the counter increases its value by "1". When the sending circuit 140-i receives a packet sending start signal 22-i issued to the sending buffer 130-i, the counter decreases its value by "1".

The flow ID information sending means 2410, when receiving a packet from the packet relaying means 110, sends the flow ID 334 to the transfer priority deciding means 2440 and the statistical information collecting means 2490 as flow ID information 23, the packet length 331 to the statistical information collecting means 2490 as packet length information 32, and the packet to the packet storing means 2450 respectively. The packet storing means 2450 stores the packet. FIG. 25 shows a block diagram of the transfer priority deciding means 2440. The transfer priority deciding means 2440 is composed of a transfer priority table 2502 and a transfer priority controlling means 2501. FIG. 26 shows a format of the transfer priority table 2502. The transfer priority table 2502 is composed of a plurality of transfer priority information 2610-k (k =1 to L), each describing the respective transfer priority as "priority" or "non-priority" for each packet.

The transfer priority controlling means 2501, when receiving the flow ID information 23, sends the information as a read address to the transfer priority table 2502 to read the transfer priority 2610-k from the table 2502. In addition, the transfer priority controlling means 2501 sends the read value to the discarding deciding means 2420 as transfer priority information 24.

The discarding deciding means 2420, when receiving the transfer priority information 24, decides whether to discard a packet stored in the packet storing means 2450 according to the sending side buffer stored packet information 25, the priority packet threshold value 26, and the non-priority packet threshold value 27 stored in the stored packet counter 2460 respectively.

When the transfer priority information 24 indicates "priority", "store" is decided in the sending side buffer 130-i if the priority packet threshold value 26 is larger than the sending side buffer stored information 25. The discarding deciding means 2420 thus sends a packet read signal 31 to the packet reading means 2430. When priority packet threshold value 26 is no larger than the sending side buffer storing information 25, the discarding deciding means 2420 decides "discard", suppresses any sending of the packet read signal 31, and sends a packet discard signal 33. The statistical information collecting means 2490 uses this signal 33 to collect statistical information. When the transfer priority information 24 indicates "non-priority", the discarding deciding means 2420 uses the non-priority packet threshold value 27 instead of the priority packet threshold value 26 to perform the similar processing. In other words, the discarding deciding means 2420 sends a packet read signal 31 when non-priority packet threshold value 27 is larger than the sending side buffer storing information 25. When non-priority packet threshold value 27 is no larger than the sending side buffer storing information 25, the discarding deciding means 2420 suppresses any sending of the signal 31 and sends a packet discard signal 33 to the packet reading means 2430. Receiving the packet read signal 31, the packet reading means 2430 reads the packet from the packet storing means 2450, sends the packet to the sending side buffer 130-i, and notifies the stored packet counter 2460 of the packet reading.

Figure 29:
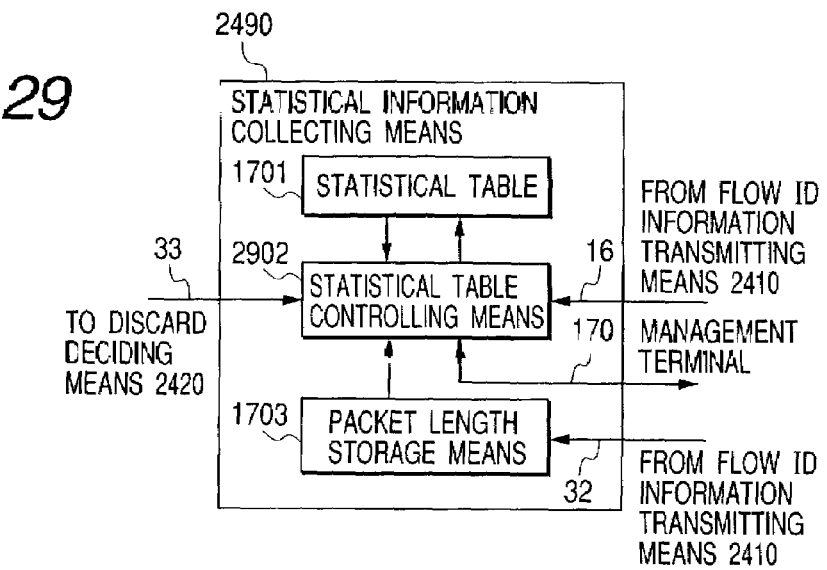
FIG. 29 is a block diagram of a statistical information collecting means of the present invention.

The statistical information collecting means 2490 of the flow processing means 190-i counts the number of bytes in each discarded packet and the number of discarded packets (decided as "discard" by the discarding deciding means 2420). FIG. 29 shows a block diagram of the statistical information collecting means 2490. The statistical information collecting means 2490 is the same as the statistical information collecting means 1130 of the flow processing means 160-i except that the statistical information table controlling means 1702 is replaced with the statistical information table controlling means 2902.

The statistical information collecting means 2490, when receiving the packet length information 32, stores the packet length 331 in the packet length storage means 1703. The statistical information table controlling means 2902, only when receiving a packet discard signal 33, uses the flow ID information 16 as a read address to read the statistical entry 1810-k from the statistical information table 1701. The statistical information table controlling means 2902 adds the packet length read from the packet length storage means 1703 to the value of the read value of the byte counter 1811-k and adds "1" to the value of the packet counter 1812-k respectively, then writes back the result in the read address in the statistical information table 1701.

The flow detecting means 600/2100/3200 of the header processing means 120 assigns a unique flow ID in the router 100 to each flow or flow bundle, and the flow processing means 190-i performs priority-based transferring and statistical information collecting according to the flow ID such that the number of flow detecting means does not increase even when the number of flow processings increases.

FIG. 36 shows an input screen of the management terminal 170 on which a transfer priority information corresponding to each flow ID is inputted. Each line displayed on the screen indicates a command Priority for setting a transfer priority level for each flow ID. The commands on the first and third lines specify "non-priority" as the transfer priority for packets having the flow ID "4" or "5" respectively, and the command on the second line sets "priority" as the transfer priority for packets having the flow ID "3". When the commands are inputted to the management terminal 170, the values shown in FIG. 40 are written in the transfer priority table 2502.

The use of the router of the present invention as an edge router enables the backbone router to omit the flow detecting means. Even when the backbone router uses flow detecting means, the flow detecting means will not lower the throughput of the whole network.

According to the router of the present invention, therefore, the number of flow detecting means does not increase even when the number of flow processings to be performed increases.

Furthermore, the router of the present invention can perform bandwidth monitoring and statistical information collecting for each flow bundle consisting of a plurality of flows.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A packet transferring apparatus that outputs an inputted packet to any one of a plurality of output lines and is connected to a node, the apparatus comprising:
    a flow detecting unit for deciding a flow ID that is an identifier of a flow bundle to which the inputted packet belongs according to information written in a header of the packet; and
    a packet transmitting unit for adding the decided flow ID to the packet and sending the packet to the node, wherein
    the node comprises a flow processing unit for performing at least one of packet processings including bandwidth monitoring, statistical information collecting, filtering, and priority-based transferring according to the flow ID,
    wherein the flow detecting unit includes
    a contents addressable memory having a plurality of flow entries, each including information written in a packet header, the memory being configured to determine a matching/unmatching between the header information of each inputted packet and each of the plurality of flow entries so as to output matching addresses which are addresses of matched flow entries; and
    an address translating unit for translating a plurality of the matching addresses to one flow ID.

2. The packet transferring apparatus according to claim 1, wherein the address translating unit includes:
    an address translation table that stores a flow ID for each of the matching addresses; and
    an address translation table controlling means for inputting each of the matching addresses as an address for reading the flow ID from the address translation table.

3. The packet transferring apparatus according to claim 1, wherein each packet is decided with one unique flow ID.

4. The packet transferring apparatus according to claim 1, wherein the flow detecting unit includes means for deciding a new flow ID according to the flow ID written in the header of the inputted packet so as to identify the new flow ID that is the identifier of the flow bundle to which the inputted packet belongs to write the new flow ID in the header.

5. The packet transferring apparatus according to claim 1, wherein the node performs said at least one packet processing on all packets that belongs to the flow bundle collectively.

6. The packet transferring apparatus according to claim 4, wherein the new flow ID is decided by the flow ID in conjunction with source site information included in the header of the inputted packet.

7. The packet transferring apparatus according to claim 4, wherein each packet is decided with one unique new flow ID.

* * * * *